United States Patent
Murata et al.

(10) Patent No.: US 7,332,679 B2
(45) Date of Patent: Feb. 19, 2008

(54) WEIGHING DEVICE EQUIPPED WITH POWER SUPPLY MECHANISM HAVING FIXED SECTION AND MOVABLE SECTION

(75) Inventors: Shuji Murata, Ritto (JP); Yukio Wakasa, Ritto (JP); Takashi Kimura, Ritto (JP); Masayoshi Nakajima, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 24 days.

(21) Appl. No.: 10/595,759

(22) PCT Filed: Oct. 8, 2004

(86) PCT No.: PCT/JP2004/014937

§ 371 (c)(1),
(2), (4) Date: May 10, 2006

(87) PCT Pub. No.: WO2005/045375

PCT Pub. Date: May 19, 2005

(65) Prior Publication Data

US 2007/0119633 A1    May 31, 2007

(30) Foreign Application Priority Data

Nov. 10, 2003  (JP) .............................. 2003-379776
Nov. 14, 2003  (JP) .............................. 2003-385482

(51) Int. Cl.
*B65B 1/36* (2006.01)
*G01G 13/06* (2006.01)
*G01G 11/00* (2006.01)
*G08C 19/00* (2006.01)

(52) U.S. Cl. ...................... 177/25.18; 177/83; 177/103; 177/145; 340/870.3; 340/870.31; 340/666; 307/104

(58) Field of Classification Search ............. 177/25.18, 177/83, 103, 104, 145; 340/870.3, 870.31, 340/666; 307/104
See application file for complete search history.

(56) References Cited

U.S. PATENT DOCUMENTS 3,268,880 A  *  8/1966  Miller .................... 340/870.18

(Continued)

FOREIGN PATENT DOCUMENTS

JP        62-175624 A      8/1987

(Continued)

OTHER PUBLICATIONS

"How Real Electric Motors Work: 1. Induction Motors", Physics Resources for Teachers and Studetns, John Story, University of New South Wales, School of Physics, Sydney, Australia (http://www.phys.unsw.edu.au/hsc/hsc/electric_motors1.html), © 2006, pp. 1-6.*

(Continued)

*Primary Examiner*—Randy W Gibson
(74) *Attorney, Agent, or Firm*—Global IP Counselors, LLP

(57) ABSTRACT

A weighing section includes a plurality of weighing members and a power supply mechanism. The weighing members weigh an object while moving. The power supply mechanism includes a fixed section, a rotatable section moving along the movement of the weighing members, a primary coil provided on the fixed section, and a secondary coil provided on the rotatable section. The power supply mechanism supplies power to the primary coil, retrieves an induced electromotive force from the secondary coil, and supplies power to the weighing members.

10 Claims, 19 Drawing Sheets

U.S. PATENT DOCUMENTS

| | | | | |
|---|---|---|---|---|
| 4,011,551 A | * | 3/1977 | Adler | 340/870.28 |
| 4,404,559 A | | 9/1983 | Renner | |
| 4,558,320 A | * | 12/1985 | Pedrazza | 340/870.3 |
| 5,521,444 A | * | 5/1996 | Foreman | 307/104 |
| 5,646,375 A | * | 7/1997 | Neuman | 177/54 |
| 5,700,982 A | * | 12/1997 | Neuman | 177/229 |
| 5,801,644 A | * | 9/1998 | Ruthroff | 340/870.31 |
| 5,813,195 A | * | 9/1998 | Nielsen et al. | 53/443 |
| 5,889,235 A | * | 3/1999 | Kawanishi et al. | 177/25.18 |
| 6,073,667 A | * | 6/2000 | Graffin | 141/372 |

FOREIGN PATENT DOCUMENTS

| | | |
|---|---|---|
| JP | 3/292207 A | 12/1991 |
| JP | 4/130230 A | 5/1992 |
| JP | 11-44570 A | 2/1999 |
| JP | 2002-181617 A | 6/2002 |
| WO | 97/14020 A1 | 4/1997 |

OTHER PUBLICATIONS

"Induction Motors" Hyper-Physics: Electricity and Magnetism, C.R. Nave, Georga State University, Department of Physics and Astronomy (http://hyperphysics.phy-astr.gsu.edu/hbase/magnetic/indmot.html), © 2005, pp. 1-4.*

"Induction Motors: Part I—Analysis" S.E. Zocho; Schweitzer Engineering Laboratories, Inc. (http://www.selinc.com/techpprs/6023.pdf), Undated PDF on the Internet, pp. 1-11.*

"Basic AC-DC Power Supplies" (http://www.ibiblio.org/kuphaldt/socratic/output/supply1.pdf), Undated PDF file on the Internet posted under the Creative Commons Attribution License, version 1.0, pp. 1-32.*

"Handbook of Electric Motors, Second Edition, Revised and Expanded", Toliyat et al., Ed., © 2004 by Marcel Dekker, Inc. New York, N.Y., pp. 35-45.*

* cited by examiner (a)

(b)

WEIGHING DEVICE EQUIPPED WITH POWER SUPPLY MECHANISM HAVING FIXED SECTION AND MOVABLE SECTION

TECHNICAL FIELD

The present invention relates to a weighing device, and in particular to a weighing device including a weighing member for weighing an object while moving.

BACKGROUND ART

Conventionally, devices for weighing an object while moving the object together with a weighing member (see, for example, patent document 1) are known. A weighing device described in patent document 1 circulates a weighing member along a predetermined path and detects the weight of an object in the weighing member from the time in which the object is placed into the weighing member until the time in which the object is discharged therefrom.

In the weighing device described in patent document 1, the weighing member includes a solar cell which is charged in the weighing member upon the receipt of light from a lamp light source.

Patent document 1: Japanese Laid-Open Patent Publication No. 4-130230

DISCLOSURE OF INVENTION

The weighing device described in patent document 1 supplies power to the weighing member by irradiating the solar cell in the weighing member with light from a lamp light source.

When using this type of solar energy power generation (power generation using light), a lamp light source for emitting strong light is required. In order to have the lamp light source continue supplying light, maintenance work that takes the service life and the deterioration of the lamp light source into consideration must be performed on the lamp light source. In addition, in generating power using light, it is assumed that a sufficient power source cannot be ensured unless a rechargeable battery is provided as in the weighing device described in patent document 1, and that a photovoltaic panel having a predetermined area size must be provided. However, these elements are disadvantageous in terms of cost and space. Furthermore, when a rechargeable battery is used, one must consider the fact that the service life of the battery is influenced by the number of times it has been charged and discharged, the ambient temperature, and the like.

An object of the present invention is to provide a weighing device in which there is no need to do any maintenance work on a lamp in a power supply mechanism that supplies power to a weighing member that weights an object while moving, and which can be made compact.

A weighing device according to a first aspect comprises a weighing member and a power supply mechanism. The weighing member weighs an object while moving. The power supply mechanism includes a fixed section, a movable section, a primary coil, and a secondary coil. The movable section is movable in accordance with the movement of the weighing member. The primary coil is provided on the fixed section. The secondary coil is provided on the movable section and faces the primary coil. The power supply mechanism supplies power to the primary coil, retrieves an induced electromotive force from the secondary coil, and supplies power to the weighing member.

According to the above, when power is supplied to the primary coil in the fixed section, an induced electromotive force is generated in the secondary coil facing the primary coil, and the induced electromotive force is supplied to the weighing member as power. Since the primary coil and the secondary coil do not need to be in contact with each other, the movable section may be designed to be freely movable with respect to the fixed section.

Since the power supply mechanism uses two coils, it is not necessary to provide a light emitting device such as a lamp. This makes maintenance relatively easy. In addition, a photovoltaic panel having a relatively large area, which is necessary to generate power upon the receipt of light, is not necessary. This easily makes the power supply mechanism compact. Furthermore, a structure which retrieves an induced electromotive force from the secondary coil will achieve a battery-free power supply mechanism more easily than a photovoltaic system.

A weighing device according to a second aspect based on the first aspect comprises a plurality of weighing members. The power supply mechanism divides and supplies the power to the plurality of weighing members.

According to the above, one power supply mechanism is provided for two or more weighing members. For this reason, the power supply mechanism needs to have a high power supply capability. The power supply mechanism retrieves an induced electromotive force using two coils instead of using the conventional photovoltaic power generation. Therefore, a high power supply capability is easily achieved with a power supply mechanism having a relatively compact structure.

In a weighing device according to a third aspect based on the first or second aspect, the power supply mechanism further includes a rectification circuit and a smoothing circuit. The rectification circuit and the smoothing circuit are provided on a power supply path from the secondary coil to the weighing members.

According to the above, although the direction of current flow, and the value, of the induced electromotive force (AC) changes moment by moment, the current flow thereof is made uniform by the rectification circuit, and the voltage thereof is kept constant by the smoothing circuit including an electrolytic capacitor or the like. The induced electromotive force can be supplied to the weighing members in this state.

A weighing device according to a fourth aspect based on any one of the first through third aspects does not include a charger, and the power is supplied to the weighing member only from the power supply mechanism.

According to the above, the weighing device is a so-called battery-free device with no charger. Since the weighing device includes a power supply mechanism capable of reliably supplying power with two coils, the power supply to the weighing members will not be substantially interrupted. Such a battery-free weighing device can easily reduce costs compared to a structure having a combination of a power supply mechanism for performing photovoltaic power generation, and a charging section.

With a structure that supplies power to a weighing member via a battery, weighing cannot be performed until the batter is charged to a predetermined capacity, such as immediately after the power is turned on. By contrast, in the battery-free weighing device according to the present invention, weighing is possible immediately after the weighing device is started.

In a weighing device according to a fifth aspect based on any one of the first through fourth aspects, the secondary coil spins in accordance with the movement of the weighing member, but does not move in a direction that intersects with the rotational axis of the spinning.

According to the above, the secondary coil facing the primary coil spins but does not move in a direction crossing the rotation center axis of the spinning. Therefore, the secondary coil of the rotatable section does not move away from the primary coil of the fixed section. As a result, the electromotive force is constantly and stably induced in the secondary coil. For example, the secondary coil spins around the rotational axis that extends vertically, but does not move on a horizontal plane and does not move away from the primary coil.

In a weighing device according to a sixth aspect based on any one of the first through fifth aspects, the weighing members move along a circulating trajectory.

According to the above, the weighing members circulate.

In a weighing device according to a seventh aspect based on any one of the first through sixth aspects, the weighing members weigh a container containing an object while moving together therewith.

According to the above, the object is moved and weighed together with the container.

In a weighing device according to an eighth aspect based on any one of the first through seventh aspects, the weighing members outputs weight data wirelessly.

According to the above, power is supplied using the primary and secondary coils, which can function even in a non-contact manner. In addition, the weight data is output from the weighing members wirelessly. Therefore, the moving weighing members can be completely separated from the fixed section.

In a weighing device according to a ninth aspect based on any one of the first through eighth aspects, wherein each of the weighing members ships in and ships out the containers containing the objects while moving the containers.

A weighing device according to a tenth aspect based on any one of the first through ninth aspect further comprises a storage section for storing weight results of the weighing members in association with the container in which objects were placed.

DESCRIPTION OF REFERENCE NUMERALS

Figure 1:
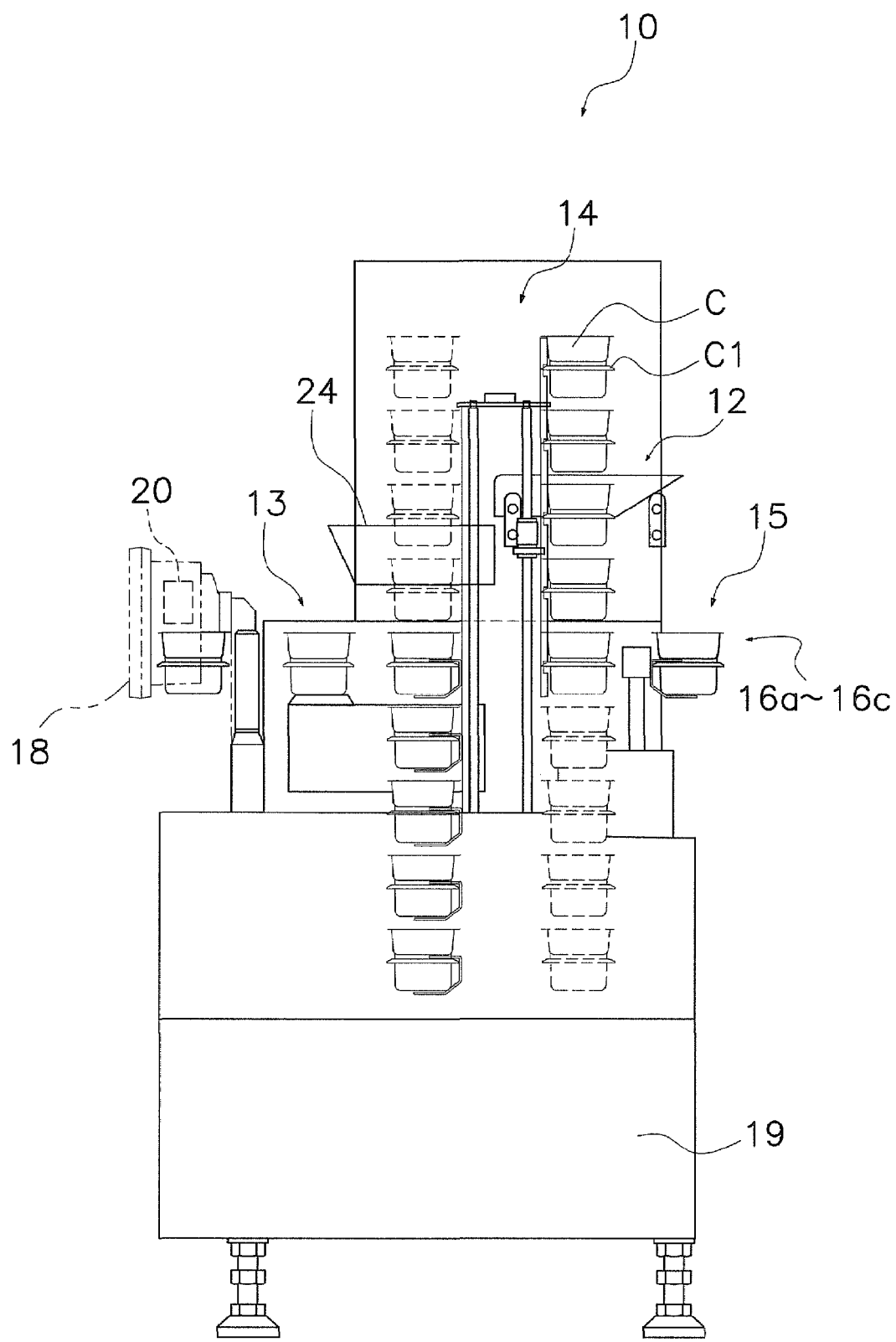
FIG. 1 is a front view of a weighing device according a first embodiment of the present invention.

10 Weighing device
12 Supply section
13 Weighing section
20 Control section
25a through 25e Weighing member
27 Load cell
28 Holder (holding section)
28a bottom plate (fourth holding member)
28b U-shaped member
28c Arm portion (second holding member, arm portion of the U-shaped member)
28d Rear surface holding section (third holding member)
28e Arm portion (first holding member, arm portion of the U-shaped member)
28f Magnet
29 External power source
50 Power supply mechanism
51 Fixed section
52 Primary coil
55 Rotatable section (movable section)
56 Secondary coil
58 Rectification circuit
59 Smoothing circuit
A11 Rotation center axis
C Container

BEST MODE FOR CARRYING OUT THE INVENTION

Embodiment 1

Overall Structure of the Weighing Device

Figure 2:
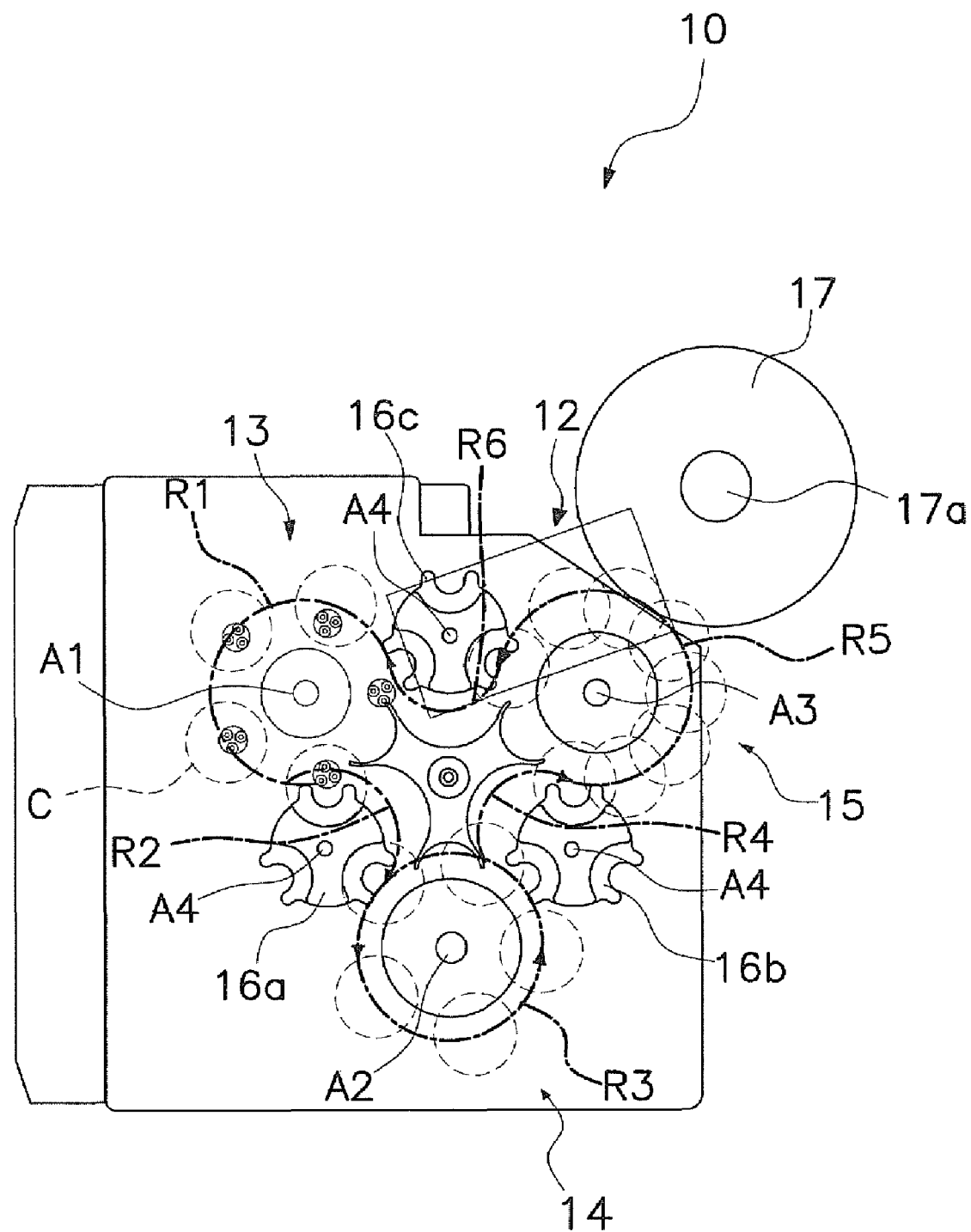
FIG. 2 is a plan view of the weighing device.

A weighing device 10 according to one embodiment of the present invention weights a weighing target object to be weighed, such as food or the like, accommodated in a container C having a top opening, retrieves a desired container C among a plurality of stocked containers C, and discharges the target object from the container C. As shown in FIG. 1 and FIG. 2, the weighing device 10 mainly includes a supply section 12, a weighing section 13, a stock section 14, a discharge section 15, transfer sections 16a through 16c, a discharge chute 17, an operation section 18, a revolving mechanism 19, and a control section 20 for controlling the entire operation of the weighing device 10.

The container C is a drinking glass-like container having a top opening and a brim portion C1 around an outer circumference thereof. The container C transports a target object from a supply position to a discharge position while circulating in the weighing device 10. The container C circulates in the weighing device 10 while constantly being moved in the weighing section 13, the stock section 14, and the discharge section 15. Therefore, with the weighing device 10 in this embodiment, the steps of supplying, weighing, stocking, and discharging a target object are performed on a moving container C. The container C is formed of metal or partially formed of metal, and is held in the weighing section 13, the stock section 14, and the discharge section 15 described below by a magnetic force in each of these sections.

The supply section 12 puts a target object to be weighed by the weighing device 10 into the moving container C.

The weighing section 13 includes a plurality of weighing members 25a through 25e (see FIG. 5), and weighs an empty container C in which no target object is accommodated and a container C accommodating a target object.

The stock section 14 stocks a plurality of containers C each accommodating a target object.

The discharge section 15 inverts a desired container C, retrieved from the plurality of containers C three-dimensionally stored in the stock section 14, while moving the desired container C toward the supply section 12. Thus, the target object accommodated in the container C can be discharged at a desired position.

The transfer sections 16a through 16c are respectively located between the weighing section 13 and the stock section 14, between the stock section 14 and the discharge section 15, and between the discharge section 15 and the weighing section 13. The transfer sections 16a through 16c each transfer a target object between the respective sections.

The discharge chute 17 is a funnel-like member having a top opening and a bottom opening 17a, and is located in the vicinity of the discharge section 15. The discharge chute 17 discharges a target object, which is discharged from the container C inverted in the discharge section 15, from the bottom opening 17a.

The operation section 18 receives a setting value such as a drive rate or the like which is input by the user, and displays various types of information regarding the drive rate or the like.

These main elements will be described later in detail.

As shown in FIG. 2, the weighing device 10 in this embodiment includes a supply and weighing zone R1, a container transfer zone R2, a stock zone R3, a container transfer zone R4, a discharge zone R5, and a container transfer zone R6 formed along a moving trajectory of the container C. The container C circulates in the weighing device 10 while moving sequentially from zone R1 to zone R6. In FIG. 2, the one-dot chain line represents a track of the center of the container C circulating in the weighing device 10.

The supply and weighing zone R1 is a zone in the weighing section 13 where a target object is supplied to the container C, and the container C and the target object are weighed. In this zone, an empty container C is first weighed. Then, a target object is put into the container C, and the container C accommodating the target object is weighed. The container transfer zone R2 is a zone in the transfer section 16a where the weighed container C is received from the weighing section 13 and transferred to the stock section 14. The stock zone R3 is a zone in the stock section 14 where the container C is received from the transfer section 16a and stored three-dimensionally. In this zone, a plurality of weighed containers C are stored three-dimensionally. The plurality of containers C are circulated in the stock section 14. The container transfer zone R4 is a zone where a container C selected by the control section 20 from the plurality of containers C stored in the stock section 14 is received and transferred to the discharge section 15. The discharge zone R5 is a zone where the container C received from the transfer section 16b is inverted while revolving (or traveling on a substantially circular path), and the target object is discharged toward the bottom opening 17a of the discharge chute 17 as a discharge target position. The container transfer zone R6 is a zone where the container C, emptied after the target object is discharged, is received from the discharge section 15 and transferred back to the weighing section 13.

The weighing device 10 in this embodiment circulates the container C therein along the zones R1 through R6 as described above.

The term "upstream" and "downstream" used below each represent a direction with respect to the above-described circulation direction of the container C.

Structure of the Supply Section

Figure 3:
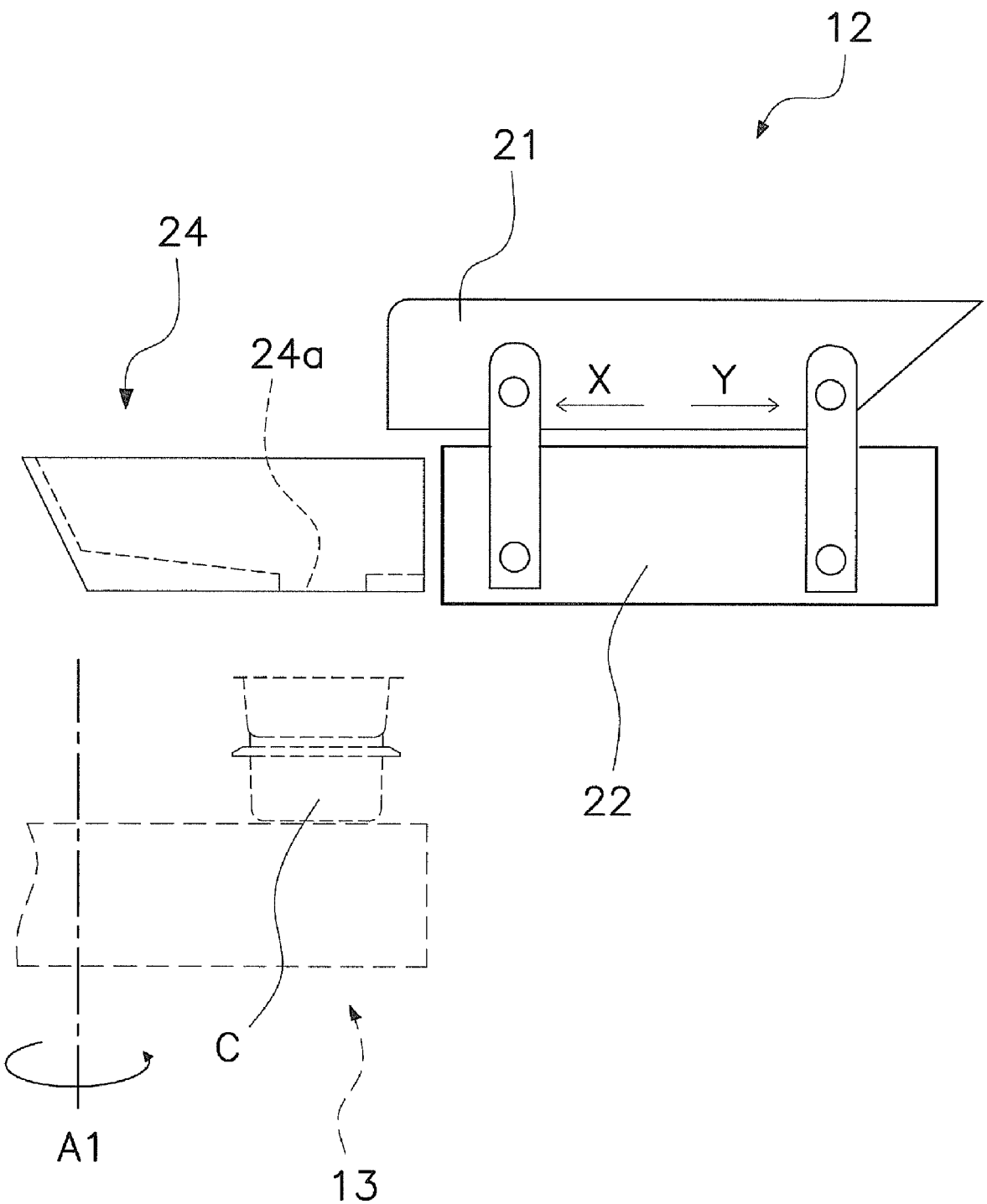
FIG. 3 is a side view of a supply section included in the weighing device.

As shown in FIG. 1 and FIG. 2, the supply section 12 is a feeder, located above a revolving track of a container C in the weighing section 13, for placing a target object into the container C revolve by the weighing section 13. As shown in FIG. 3, the supply section 12 includes a trough 21 and a motor box 22. The target object is put into a chute 24 provided below the trough 21.

A target object which is to be put into the container C is placed on the trough 21. A driving motor in the motor box 22 is rotated to move the trough 21 in an X direction in FIG. 3 slowly and in a Y direction faster than in the X direction. Thus, the target object which is placed on the trough 21 can be transported toward the chute 24 little by little continuously.

The target object is dropped from the trough 21 to the chute 24, and is placed into a container C that is revolved by the weighing section 13. Namely, the supply section 12 places a target object in a container C that is revolved around a rotational axis A11 of a rotational axis body A1 by the weighing section 13. In this manner, the operation will be made faster than when the target object is put into a stationary container C.

The chute 24 is formed of stainless steel and has a top opening and a bottom opening. The chute 24 collects target objects coming from the trough 21, and drops the target objects from directly above a container C revolving in the weighing section 13.

Structure of the Weighing Section

Figure 4:
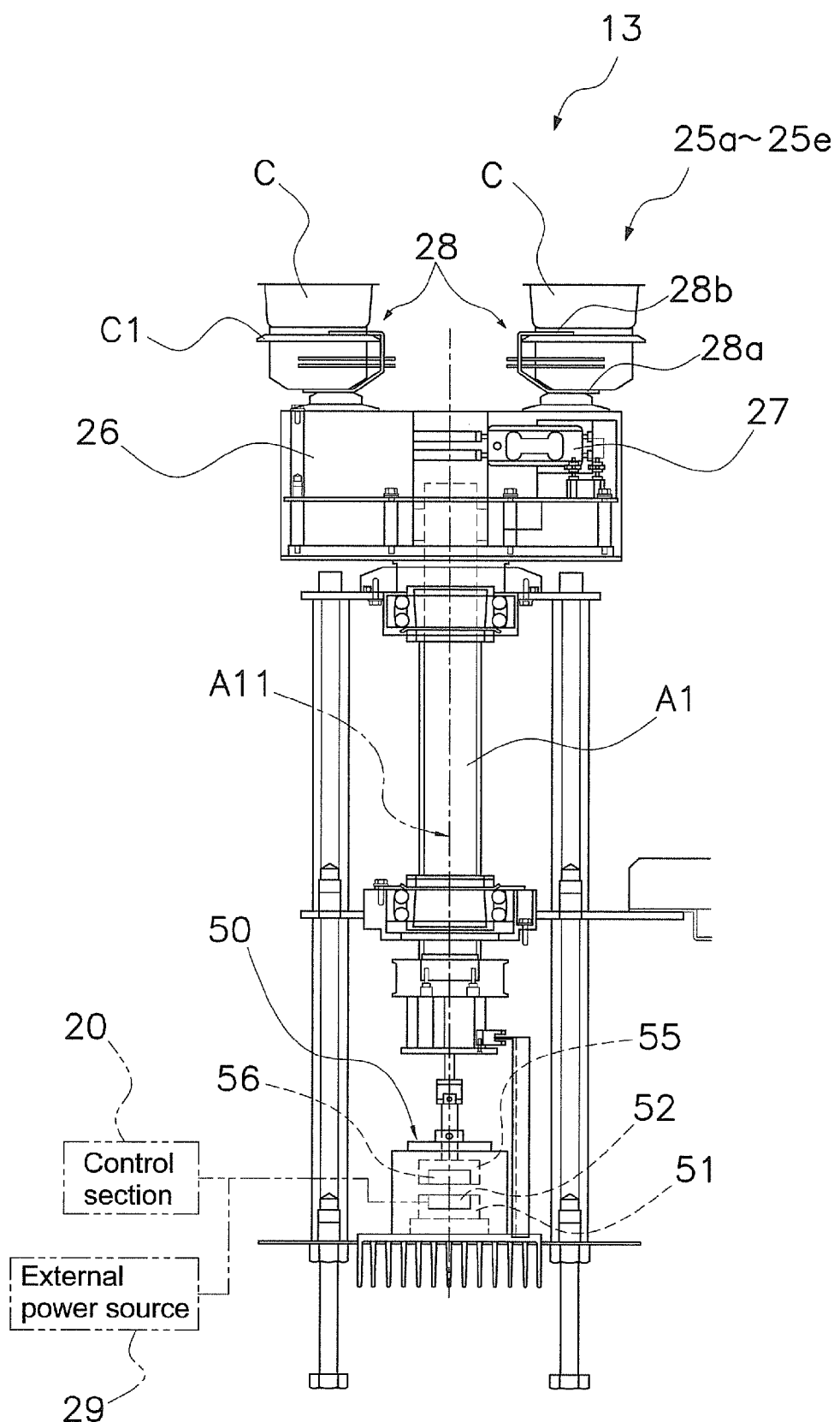
FIG. 4 is a partial cross-sectional view of a weighing section included in the weighing device, as seen from one side thereof.
Figure 5:
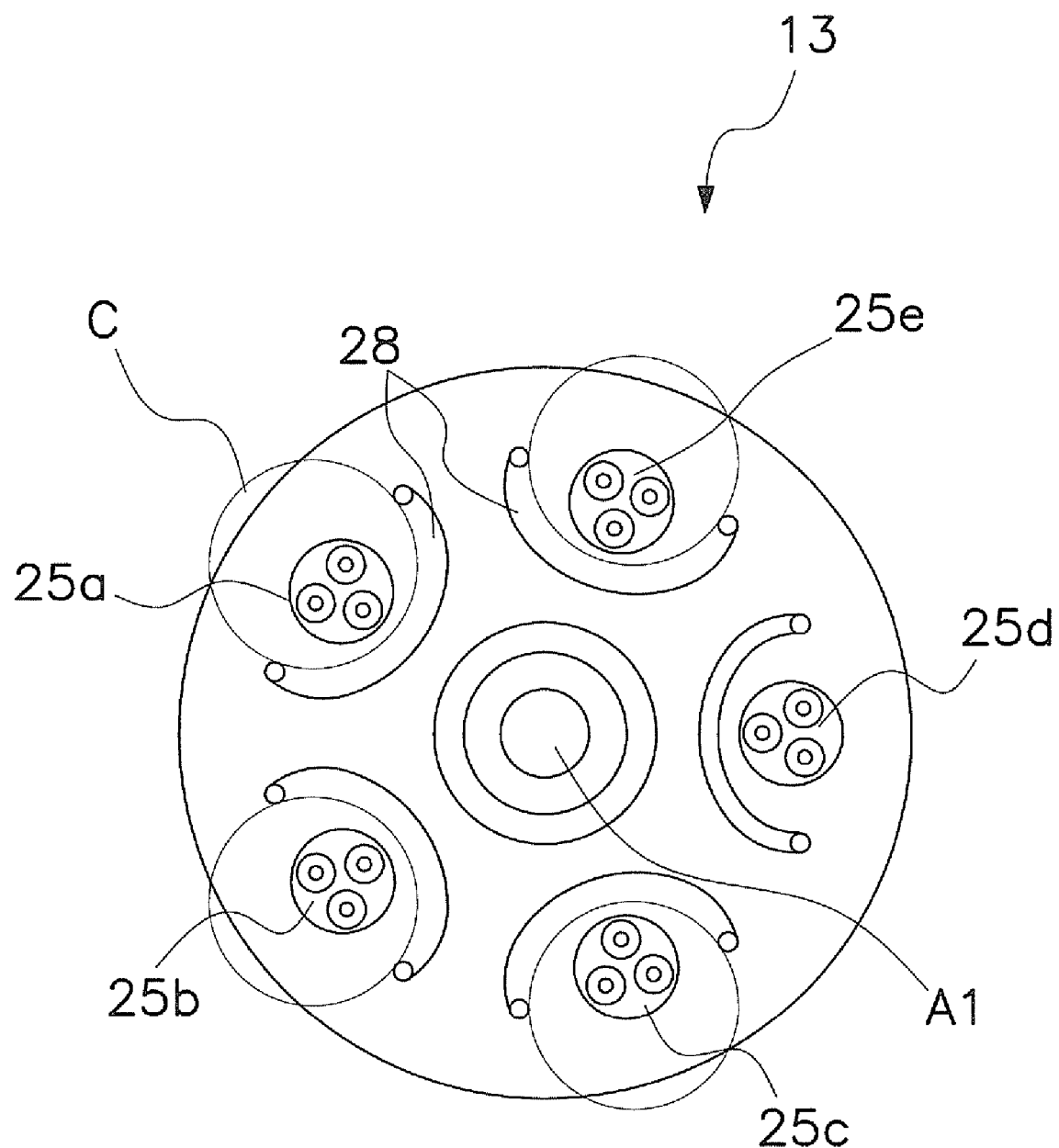
FIG. 5 is a plan view of the weighing section.

The weighing section 13 weighs a target object contained in a container C. As shown in FIG. 2, the weighing section 13 is located downstream of the discharge section 15 and upstream of the stock section 14. As shown in FIG. 4 and FIG. 5, the weighing section 13 includes five weighing members 25a through 25e, and holders 28 provided in correspondence with the weighing members 25a through 25e. The weighing section 13 causes the weighing members 25a through 25e or the like to revolve around the rotational axis A11 of the rotational axis body A1, which receives a rotational drive force transmitted from the revolving mechanism 19 described below. Namely, the weighing section 13 also functions as a transporting mechanism for a container C. The revolving mechanism 19 for rotating the rotation axis body A1 and causing the weighing members 25a through 25e to revolve will be described below in detail.

Figure 16:
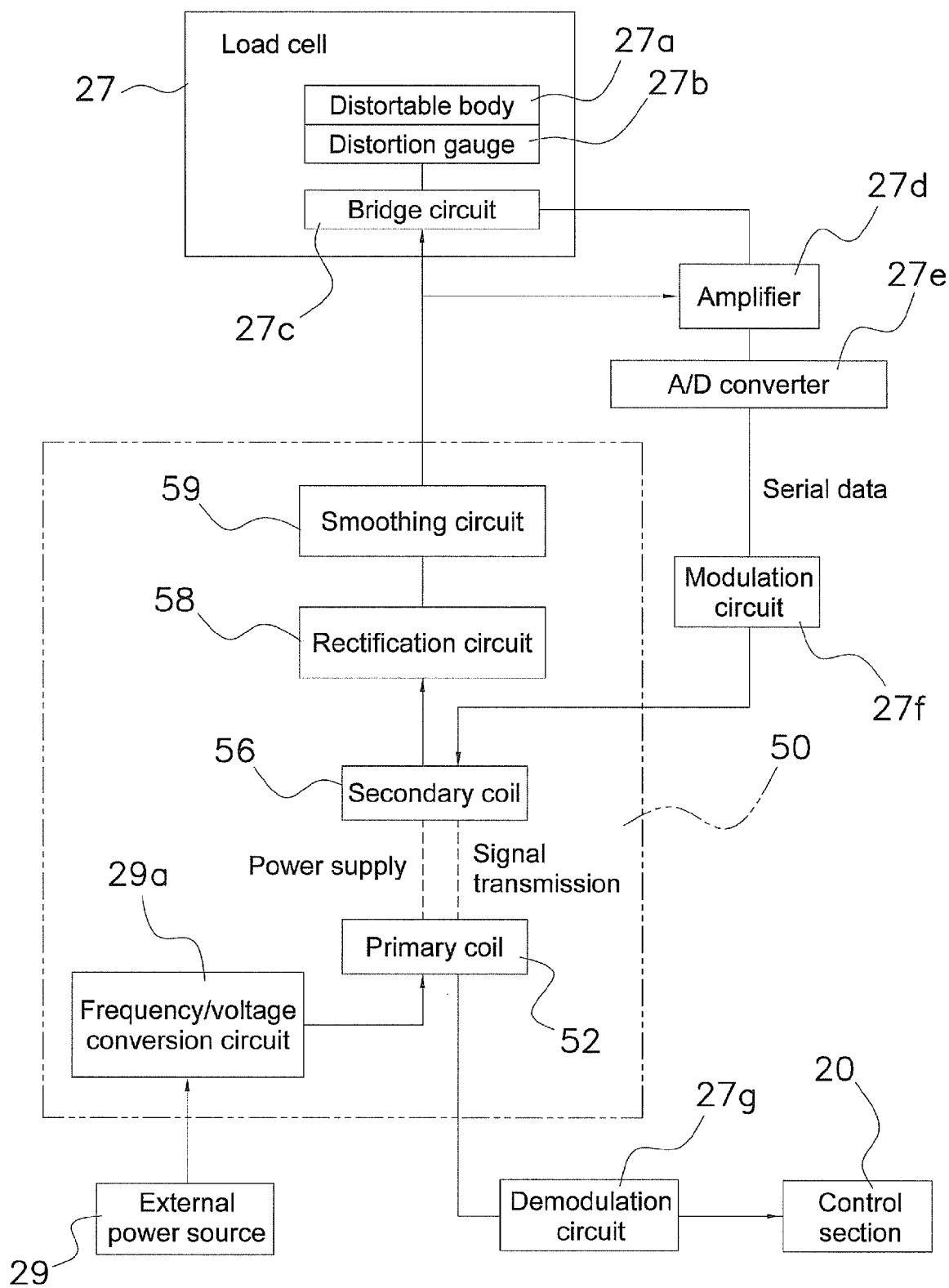
FIG. 16 is a block diagram showing a power supply mechanism in the weighing section.

As shown in FIG. 4, the weighing members 25a through 25e each have a load cell 27 in a circular box 26. As shown in FIG. 16, each load cell 27 includes a distortable body 27a, a distortion gauge 27b, and a bridge circuit 27c. The distortable body 27a has an inner end thereof fixed to the circular box 26 and an outer free end. When a load acts on the free end of the distortable body 27a, the distortion gauge 27b attached to the distortable body 27a converts the distortion of the distortable body 27a into an electric resistance change, and the bridge circuit 27c converts the electric resistance change into a voltage change and outputs the voltage change. Namely, the load cell 27 outputs a load (weight) as a voltage change.

The load cell 27 of each of the weighing members 25a through 25e is supplied with power by a power supply mechanism 50. As shown in FIG. 4 and FIG. 16, the power supply mechanism 50 mainly includes an external power source 29, a frequency/voltage conversion circuit 29a, a primary coil 52, a secondary coil 56, a rectification circuit 58, and a smoothing circuit 59.

The external power source 29 is, for example, AC200V, AC100V or DC24V. The frequency/voltage conversion circuit 29a creates a high frequency AC current by switching, and supplies the high frequency AC current to the primary coil 52. The primary coil 52 and the secondary coil 56 are provided in order to supply power for operating the load cell 27 in a non-contact manner, and transmitting an output signal from the load cell 27 in a non-contact manner. The primary coil 52 is fixed to a fixed section 51, and the secondary coil 56 is integrated with a rotatable section (movable section) 55. The rotatable section 55 rotates together with the above-described rotation axis body A1 that causes the weighing members 25a through 25e to revolve, and the circular box 26. Specifically, as shown in FIG. 4, the secondary coil 56 is located slightly away from the primary coil 52, and only the secondary coil 56 rotates around the rotation center axis A11 vertically extending through the primary coil 52 and the secondary coil 56 (i.e., the secondary coil 56 "spins" around a fixed axis). Namely, the secondary coil 56 spins in accordance with the rotation of the rotation axis body A1, but does not separate from the primary coil 52 as a result of such spinning movement. The distance between the primary coil 52 and the secondary coil 56 is kept substantially the same. In other words, the secondary coil 56 spins in accordance with the revolving movement of the weighing members 25a through 25e, but does not move in a direction (e.g., in a horizontal direction) that intersects the rotation center axis A11 around which the secondary coil 56 spins.

When power is supplied from the external power source 29 to the primary coil 52 via the frequency/voltage conversion circuit 29a, an induced electromotive force (AC) is generated in the secondary coil 56, which faces the primary coil 52, by means of a magnetic field created by the primary coil 52. The induced electromotive force is supplied to the load cell 27 of each of the weighing members 25a through 25e and an amplifier 27d as power. It should be noted that the induced electromotive force generated in the secondary coil 56 is not supplied to the load cell 27 directly, but is supplied via the rectification circuit 58 and the smoothing circuit 59. Namely, the rectification circuit 58 and the smoothing circuit 59 are located on a power supply path from the secondary coil 56 to the load cell 27 of each of the weighing members 25a through 25e. The direction of current flow, and the value of the induced electromotive force, changes moment by moment. Therefore, after leaving the secondary coil 56, the direction of the current flow of the induced electromotive force will be made uniform by the rectification circuit 58 having a diode, and the voltage thereof will be kept constant by the smoothing circuit 59 having a large capacity electrolytic capacitor. The induced electromotive force is further stabilized as power by a regulator, and then is divided and supplied to the load cells 27 or the like. Since such stable power is provided, the reliability of the activation of the load cell 27 is improved despite the very weak output signal thereof.

Owing to the primary coil 52 and the secondary coil 56 constantly facing each other closely, the power supply mechanism 50 can reliably supply power to the load cell 27 or the like even in a non-contact manner. Therefore, the power supply mechanism 50 does not include a charger the like. The weighing section 13 does not include any charger or the like separate from the power supply mechanism 50.

As shown in FIG. 16, a signal which is output from the load cell 27 is amplified by the amplifier 27d, converted into a digital signal by an A/D converter 27e, and transferred to the secondary coil 56 via serial communication. At this point, the signal for serial communication is modulated by a modulation circuit 27f, is transferred from the secondary coil 56 to the primary coil 52 wirelessly in a non-contact manner, and then is demodulated by a demodulation circuit 27g. The signal which is thus recovered into the original serial data is sent to the control section 20 in the weighing device 10. By sending a signal from the load cell 27 to the control section 20 in this manner, noise is inhibited from being superimposed on the very weak output signal from the load cell 27. In addition, filtering is also conducted in order to minimize the amount of communication data. The signal may be transferred via serial communication using infrared, instead of being transferred in a non-contact manner using the primary coil 52 and the secondary coil 56.

Owing to the load cell 27 located in the circular box 26, the weighing members 25a through 25e each weigh a container C held by the holder 28 while revolving. In other words, the weighing members 25a through 25e each revolve around the rotation center axis A11 together with the rotation axis body A1 and the circular box 26, and thus draw a circular trajectory along a horizontal plane. Since weighing is performed while each of the weighing members 25a through 25e is revolving toward the stock section 14 for the next step, the process from weighing to stocking can be expedited. Even though weighing is performed while each of the weighing members 25a through 25e is moving, the time until each of the weighing members 25a through 25e revolves to the transfer position in the transfer section 16a provided between the weighing section 13 and the stock section 14 will be sufficient in order to perform weighing.

Each holder 28 includes a bottom plate 28a for supporting a bottom surface of the container C from below and a U-shaped member 28b. The U-shaped member 28b covers the brim portion C1 formed around the outer circumference of the container C to hold the container C between the bottom plate 28a and the U-shaped member 28b. The bottom plate 28a of the holder 28 has a magnet (permanent magnet) embedded therein. Owing to the magnetic force of the magnet, the container C formed of metal can be held. The magnet may be embedded in a side wall instead of the bottom plate 28a, or may be embedded in both the bottom plate 28a and the side wall. This is also applied to holders 31 and 35 described later.

Weighing is performed in a state where the container C and each of the weighing members 25a through 25e are stationary relative to each other. Namely, weighing is performed where the container C and each of the weighing members 25a through 25e are moving at the same speed. Thus, even though the container C is moving, weighing can be accurately performed like when the container C is stationary.

The container C may be formed of a resin. The holder 28 may hold the container C by an element other than a magnet.

The weighing section 13 receives the container C, emptied after the target object is discharged in the discharge section 15, from the transfer section 16c, and moves the empty container C to directly below a bottom opening 24a of the chute 24 in the supply section 12 while weighing the empty container C. In this manner, the weighing section 13 receives the container C which has been subjected to the process of weighing to discharging, and sends the container C back to the process of weighing to discharging. Thus, the container C can be circulated in the weighing device 10. In this embodiment, one chute 24 is provided. Alternatively, the same number of chutes as the weighing sections 13 may be provided. In such a case, each chute 24 revolves around the rotation axis body A1 together with the corresponding weighing section 13.

Structure of the Stock Section

Figure 6:
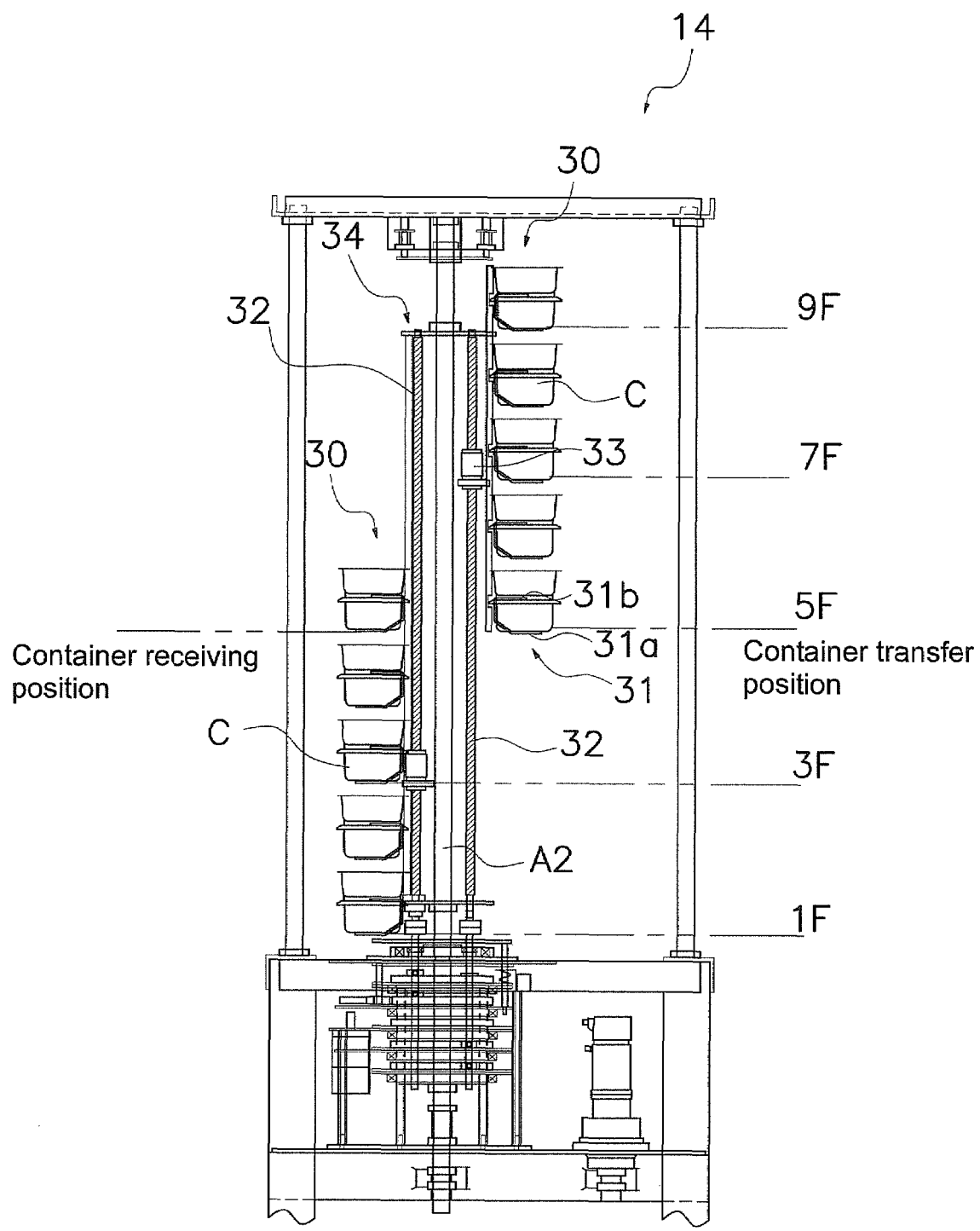
FIG. 6 is a side view of a stock section included in the weighing device.
Figure 7:
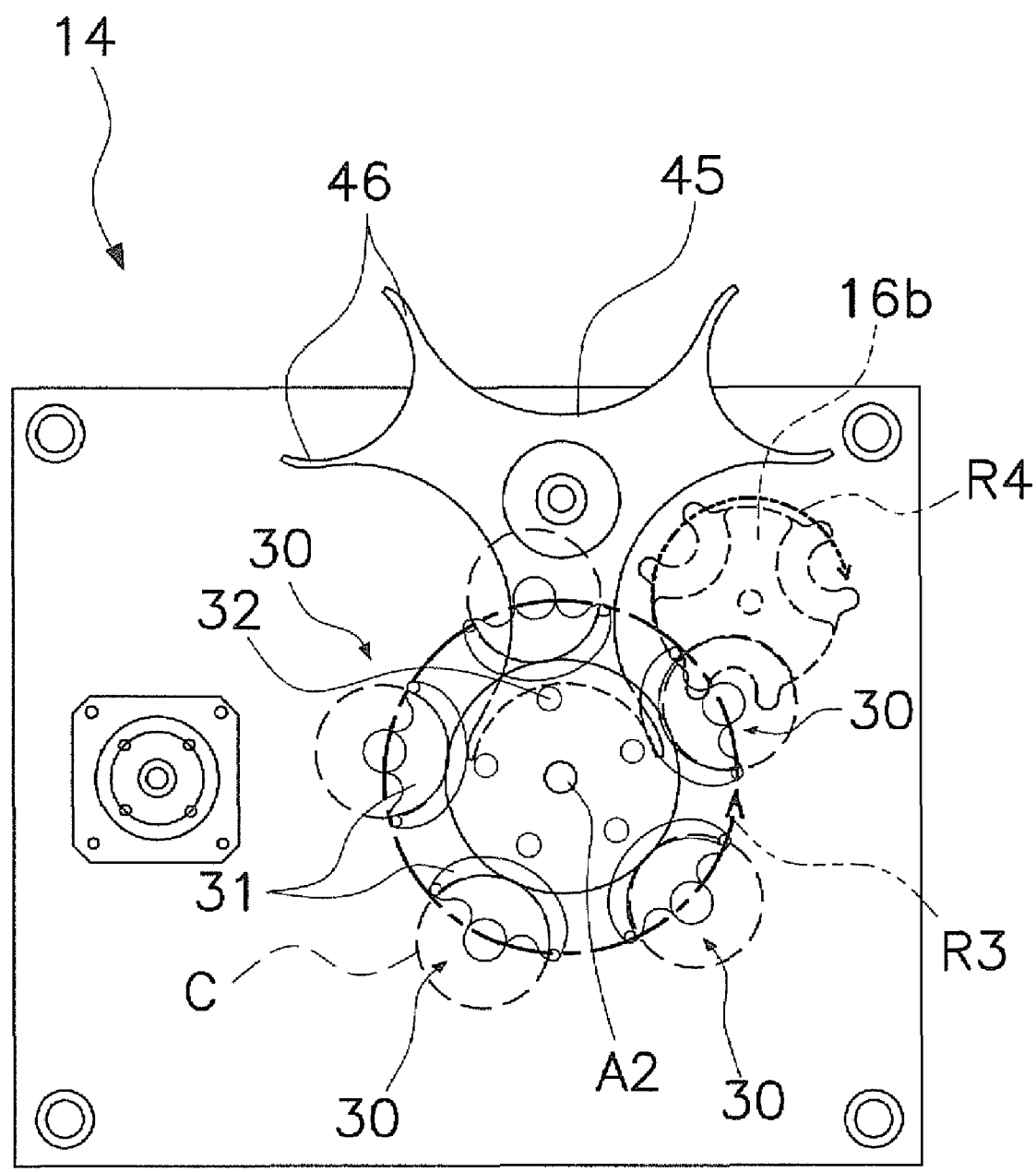
FIG. 7 is a plan view of the stock section.

The stock section 14 stores a plurality of containers C which have been weighed in the weighing section 13. As shown in FIG. 2, the stock section 14 is located downstream of the weighing section 13 and immediately upstream of the discharge section 15. Therefore, the stock section 14 can immediately transfer the container C selected by the control section 20 (see FIG. 1) to the discharge section 15. As shown in FIG. 6 and FIG. 7, the stock section 14 includes five storage sections 30 each capable of holding five containers C vertically. The storage sections 30 are located at an equal interval in a circumferential direction around a rotation center axis of a rotation axis body A2.

The storage sections 30 each have five holders 31 arranged vertically in order to hold five containers C vertically. Like the holder 28 in the weighing section 13, each holder 31 has a bottom plate 31a for supporting the bottom surface of a container C from below and a U-shaped member 31b. The holder 31 also holds a metal container C owing to the magnetic force of the magnet embedded in the bottom plate 31a.

The stock section 14 causes the storage sections 30 to revolve around a rotation center axis of the rotation axis body A2. Thus, the stock section 14 also functions as a transporting mechanism of a container C, like the weighing section 13. The stock section 14 stocks the containers C while constantly causing the containers C to revolve horizontally. Therefore, once a container C is selected by the control section 20, the selected container C can be immediately transferred to the transfer section 16b from the stock section 14.

The stock section 14 also has a mechanism 34 for moving the storage sections 30 vertically.

The mechanism 34 includes shafts 32 each having a screw groove formed therein, motors (not shown) for rotating the shafts 32 that are located below the shafts 32, and coupling members 33 for coupling the storage sections 30 and the shafts 32. The mechanism 34 rotates the shafts 32 forward and rearward by means of the motors attached to the bottom of the five shafts 32, so as to move the coupling members 33 attached to the shafts 32 up and down. In more detail, the motor for rotating each shaft 32 constantly rotates the shaft 32 in synchronization with the rotation rate of the rotation axis body A2. Therefore, the shaft 32 can be in stationary with respect to the rotation axis body A2 while revolving around the rotation axis body A2. In order to move the containers C vertically, the rotation rate of the motor for constantly rotating the shaft 32 is increased or decreased, so as to rotate the shaft 32 forward or rearward with respect to the rotation axis body A2. As a result, the containers C held in each storage section 30 can be moved vertically together with the coupling member 33.

Since the stock section 14 includes the mechanism 34 for moving the containers C vertically, the stock section 14 can store a plurality of containers C three-dimensionally. In addition, containers C which have been horizontally moved from the transfer section 16a are stored three-dimensionally, and the containers C which have been stored vertically are moved horizontally and transferred to the transfer section 16b. Therefore, the moving direction and the storage direction of the containers C can intersect with each other. At the start of driving, the five storage sections 30 are located between 1F and 5F shown in FIG. 6. In response to a request to select a container C from the control section 20, the five storage sections 30 each move vertically between 1F and 9F while holding five containers C. In FIG. 6, 1F through 9F represent floors at which the containers C are located vertically.

With the weighing device 10 in this embodiment, the storage sections 30 holding five containers C receive and transfer containers C at the height of 3F, which corresponds to the center of each storage section 30 at the start of driving. Thus, regardless of which floor the container C to be retrieved is located, the vertical moving distance of the storage section 30 can be limited to two floors up or down with respect to 5F.

The stock section 14 receives and transfers a container C at the same floor (height). Namely, as shown in FIG. 6, a container C is received from the transfer section 16a at 5F and transferred to the transfer section 16b also at 5F. Owing to the system of receiving and transferring a container C at the same height, after a container C is discharged, a new container C can be added the same position merely by causing the storage sections 30 to revolve around the rotation center axis of the rotation axis body A2.

Structure of the Discharge Section

Figure 8:
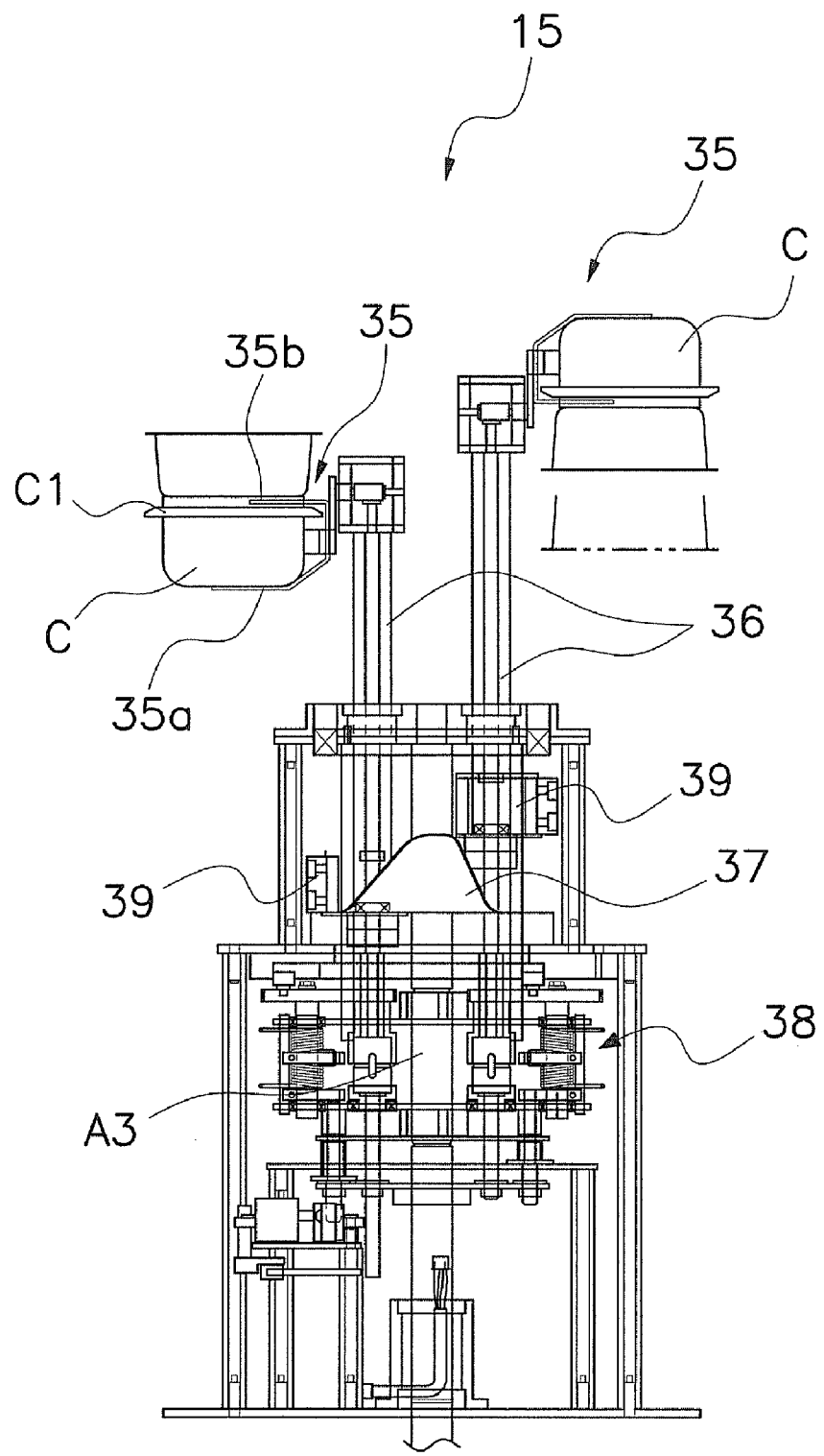
FIG. 8 is a side view of a discharge section included in the weighing device.
Figure 9:
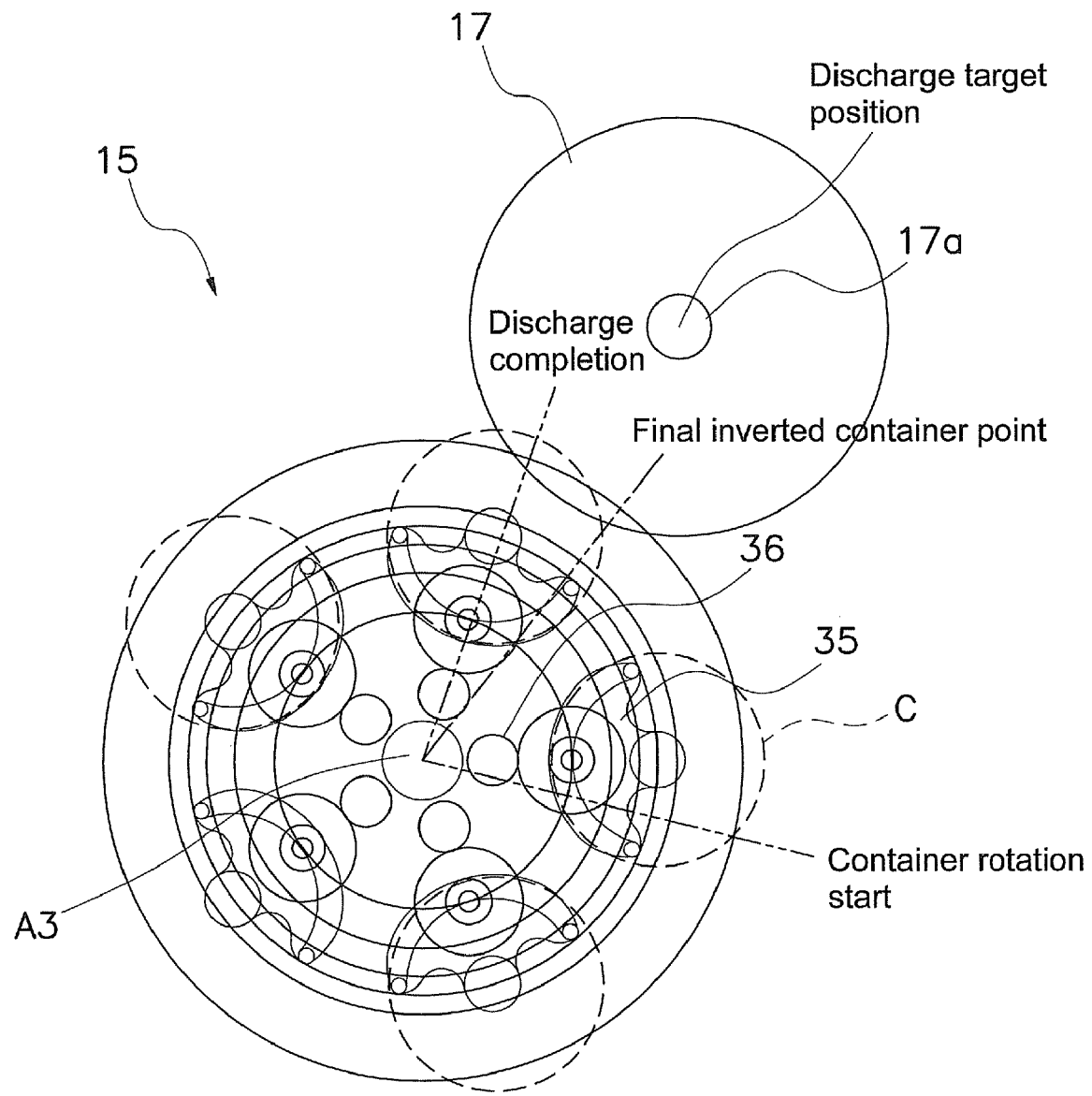
FIG. 9 is a plan view of the discharge section.

The discharge section 15 discharges a target object, which has been transported in a container C, from the container C. As shown in FIG. 2, the discharge section 15 is located downstream of the stock section 14 and upstream of the weighing section 13. As shown in FIG. 8 and FIG. 9, the discharge section 15 includes five holders 35, five shafts 36, an inclining plate 37, a rotation axis body A3, and an inversion mechanism 38.

Like the holder 28 in the weighing section 13 and the holder 31 in the stock section 14, each holder 35 has a bottom plate 35a for supporting the bottom surface of a container C from below, and a U-shaped member 35b in order to hold the container C. The holder 35 also holds a container C formed of metal owing to the magnetic force of the magnet embedded in the bottom plate 35a. The five holders 35 are located in a circumferential direction around the rotation axis body A3 at an equal interval, and revolves around a rotation center axis of the rotation axis body A3.

Each shaft 36 is a hollow metal cylinder extending vertically, and has the holder 35 attached to a top end thereof. Inside the shaft 36, members including a cam and a gear forming the inversion mechanism 38 for inverting the holder 35 are provided.

As shown in FIG. 10(a) through FIG. 10(f), guide sections 39 respectively attached to bottom ends of the five shafts 36 are raised along an inclining surface of the inclining plate 37. The five shafts 36 are provided parallel to each other, and revolve around the rotation center axis of the rotation axis body A3. Owing to such a structure, the holder 35 attached to the top end of each shaft 36 and the container C held by the holder 35 can be moved vertically.

In order to discharge the target object P from a container C, the inversion mechanism 38 drives the cam and the gear thereof provided inside the shaft 36 to rotate the holder holding the container C at 180 degrees. The timing at which the inversion mechanism 38 rotates the container C is controlled by the control section 20 (see FIG. 1), such that the target object P is discharged toward a desired discharge position in the discharge chute 17, i.e., toward the bottom opening 17*a*. The container C, which has been inverted by the inversion mechanism 38 so as to open downward, is held by the U-shaped member 35*b* of the holder 35 supporting the brim portion C1 from below.

The rotation axis body A3 causes containers C to revolve together with the holders 35. Thus, like the weighing section 13 and the stock section 14, the discharge section 15 also functions as a transporting mechanism of a container C as a result of receiving a rotation driving force transmitted from the revolving mechanism 19 described below. The rotation axis body A3 rotates in synchronization with the rotation axis bodies A1, A2 and A4 owing to a rotation driving force from a rotation motor M1 included in the revolving mechanism 19 described below.

With the weighing device 10 in this embodiment, the discharge section 15 discharges a target object P from a container C while causing the container C to revolve around the rotation center axis of the rotation axis body A3. Therefore, the target object P in the container C is discharged from the container C while being supplied with a centrifugal force. As a result, the target object P discharged from the container C can be freely dropped to the bottom opening 17*a* with centrifugal force and gravity, or the vicinity thereof, which is positioned in a central portion of the discharge chute 17 located in a tangential direction of the revolving track of the container C around the rotation axis body A3.

Structure of the Holder

Figure 19:
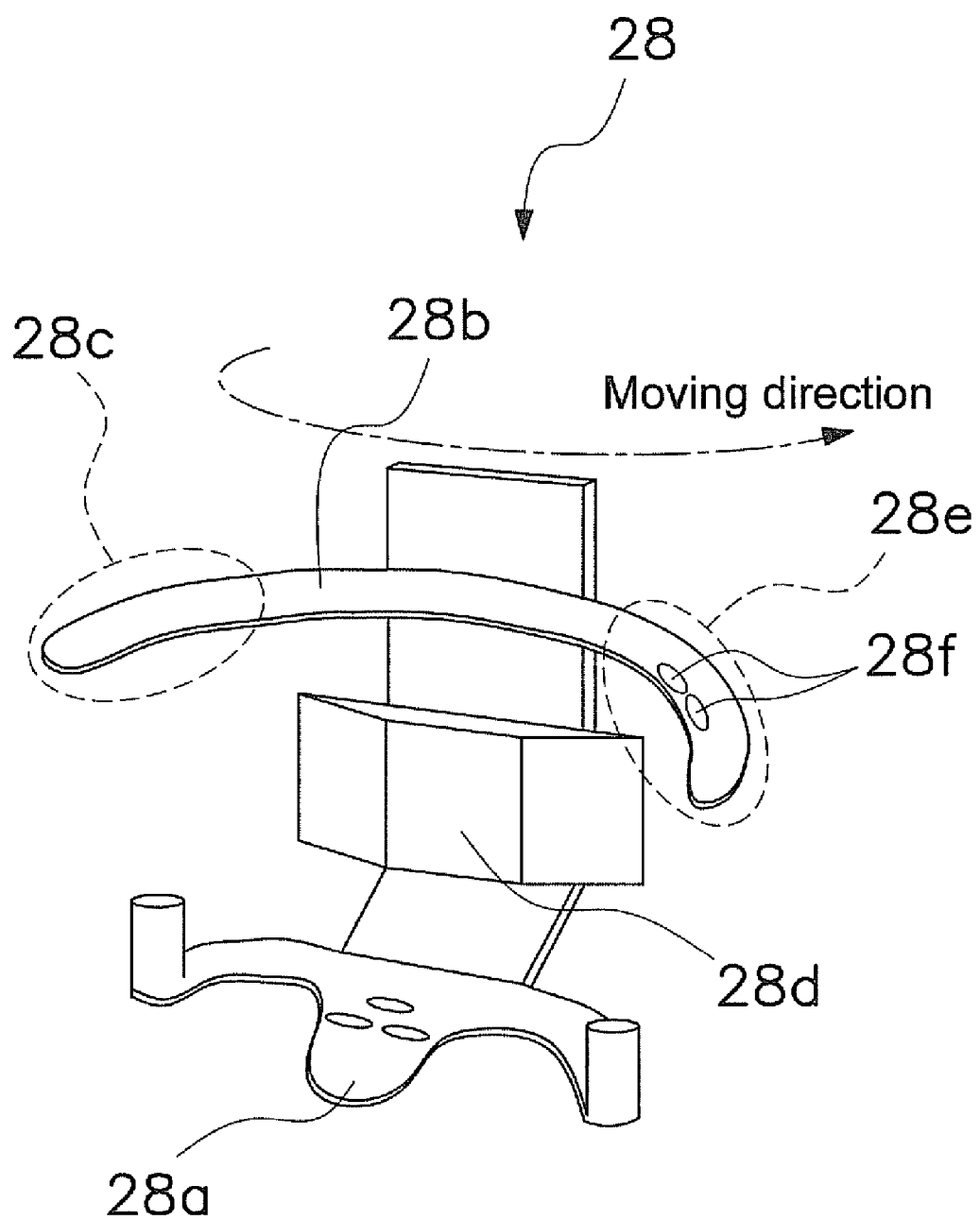
FIG. 19 is a perspective view of a holder included in the weighting section shown in FIG. 4.

As shown in FIG. 19, the holder 28 includes a U-shaped member 28*b*, a rear surface holding section (third holding section) 28*d*, and a bottom plate (fourth holding section) 28*a*.

The U-shaped member 28*b* holds a container C along a side surface of the container C. The U-shaped member 28*b* is located so as to receive the container C in an open part thereof, i.e., so as to be open outward with respect to the center of the revolving movement of the holder 28. The U-shaped member 28*b* includes an arm portion (first holding member) 28*c* located upstream in the moving direction of the container C and an arm portion (second holding member) 28*e* located downstream in the moving direction of the container C. The downstream arm portion 28*e* of the U-shaped member 28*b* has a magnet (permanent magnet) 28*f* buried therein. The stainless steel container C magnetized by the magnetic force of the magnet 28*f* is held there. The U-shaped member 28*b* is put on the brim portion C1 of the container C along the side wall of the container C, and thus the container C is held between the U-shaped member 28*b* and the bottom plate 28*a*.

At the position where the magnet 28*f* is attached to the arm portion 28*e*, a magnetic force is generated in a whirl from the magnet 28*f*. Therefore, as the container C moves closer to the magnet 28*f*, an attractive force acting on the container C gradually becomes stronger. The attractive force on the container C is not suddenly generated. Therefore, the container C can be stably received.

The rear surface holding section 28*d* holds the container C along the side surface of the container C in a horizontal direction. The rear surface holding section 28*d* is located at a bottom of a root portion of the U-shaped member 28*b*, and holds the side surface of the container C received from the transfer section 16*c* at the rearmost position of the U-shaped member 28*b*.

As shown in FIG. 4, the container C is not in contact with the rear surface holding section 28*d* having a magnet embedded therein. As shown in FIG. 5, the container C is held at two points, i.e., at both of two ends of the U-shaped member 28*b*. With a structure that supports the container C at two points, the container C is less likely to bounce in the holder 28 and will be held more stably, and therefore more accurate weighing is possible even when the container C is moved at higher speed, as compared with the case where the container C is supported at three points.

The bottom plate 28*a* holds the received container C in a vertical direction. The bottom plate 28*a* has a surface parallel to the U-shaped member 28*b*. This surface holds the bottom C2 of the container C, received from the transfer section 16*c*, from below.

The holders 28 each having the above-described structure revolve in the weighing section 13 by the rotational drive force imparted to the rotation axis body A4 from the drive source shared with the other sections (stock section 14, the discharge section 15, etc.) which are also revolving. The holders 28 revolve in synchronization with the stock section 14, the discharge section 15, the transfer sections 16*a* through 16*c*, and the like. The holders 28 also revolve in the opposite direction from the transfer section 16*c* from which the container C is transferred and the transfer section 16*a* to which the container C is transferred. Therefore, when a container C is transferred from the transfer section 16*c* or to the transfer section 16*a*, the container C continues moving generally in the same direction with no sharp curving. Thus, the container C can be transferred smoothly.

Structure of the Transfer Sections

As shown in FIG. 2, the transfer sections 16*a* through 16*c* are respectively located between the weighing section 13 and the stock section 14, between the stock section 14 and the discharge section 15, and between the discharge section 15 and the weighing section 13. The transfer sections 16*a* through 16*c* are all located at a height corresponding to 5F shown in FIG. 6.

The transfer section 16*a* is provided between the weighing section 13 and the stock section 14, and receives a weighed container C from the weighing section 13 and transfers the container C to the stock section 14. The transfer section 16*b* is provided between the stock section 14 and the discharge section 15, and receives a desired container C, selected by the control section 20 (see FIG. 1) and moved to the position of 5F in FIG. 6, from the stock section 14 and transfers the container C to the discharge section 15. The transfer section 16*c* is provided between the discharge section 15 and the weighing section 13, and receives an empty container C, after the target object is discharged in the discharge section 15, from the discharge section 15 and transfers the container C to the weighing section 13. In this manner, the transfer sections 16*a* through 16*c* transfer the container C between the steps of weighing, stocking, discharging, etc., and therefore the container C can be circulated in the weighing device 10. When the container C does not discharge the target object, the container C is transferred to the weighing section 13 while storing the target object.

Figure 11:
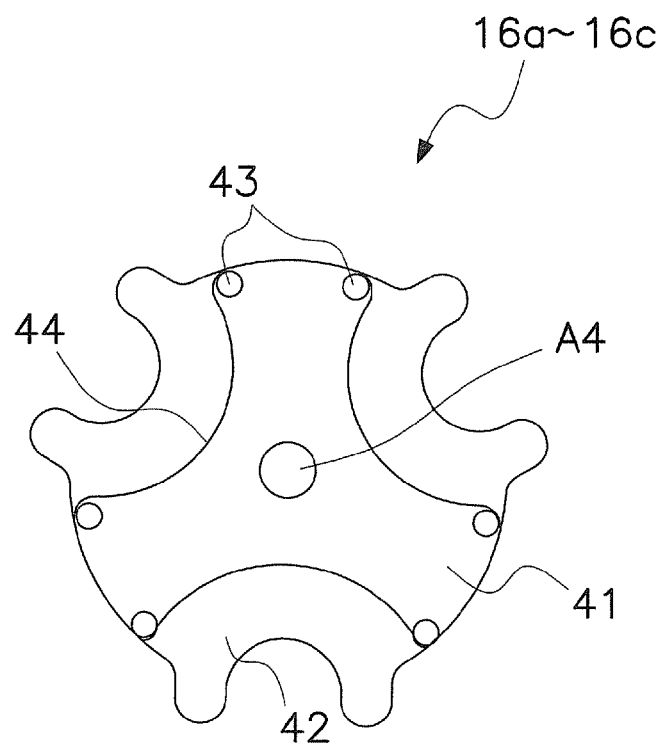
FIG. 11(a) is a plan view of a transfer section.
FIG. 11(b) is a side view of the transfer section.
Figure 11:
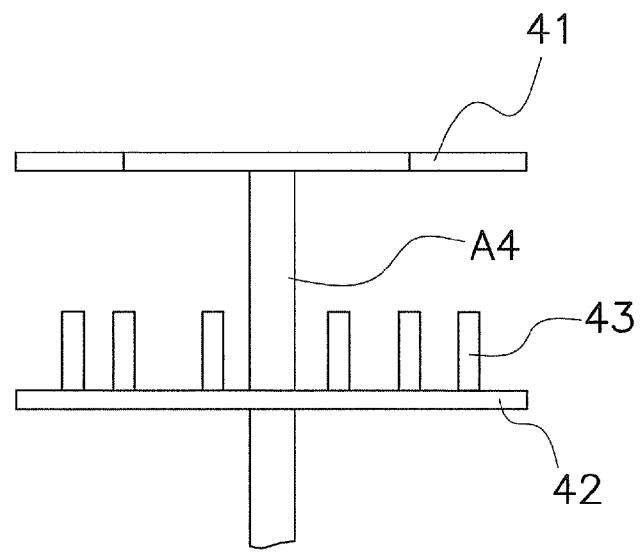

As shown in FIG. 11, the transfer sections 16a through 16c have top plates 41, bottom plates 42, and three rotatable bodies A4. Each top plate 41 has three arc-shaped portions 44 corresponding to an outer circumferential surface of a container C. Three containers C are held by the three arc-shaped portions 44. Each bottom plate 42 has six projections 43. A container C is fit between every two projections 43 and held from below. The three rotatable bodies A4 receive a rotational drive force transmitted from the revolving mechanism 19 described below, and respectively rotate the transfer sections 16a through 16c in synchronization. Thus, the transfer sections 16a through 16c each function as a transporting mechanism, and function to transfer containers C between the sections. The rotation direction of the transfer sections 16a through 16c is opposite to the rotation direction of the weighing section 13, the stock section 14 and the discharge section 15. Therefore, when a container C is transferred from each of the transfer sections 16a through 16c to a corresponding section, the container C continues moving generally in the same direction with no sharp curving. Thus, the container C can be transferred smoothly.

As shown in FIG. 7, a claw member 45 is provided in the vicinity of the transfer sections 16a through 16c as a member used for transferring a container C.

The claw member 45 has claws 46 projecting in the vicinity of each of the transfer sections 16a through 16c. The claw member 45 is fixed substantially at the center of the weighing section 13, the stock section 14, and the discharge section 15, at a height corresponding to 5F shown in FIG. 6 at which a container C is received and transferred.

With the weighing device 10 in this embodiment, for example, a container C selected by the control section 20 from the plurality of containers C revolving in the stock section 14 shown in FIG. 7 is moved vertically to the height corresponding to 5F. At the height corresponding to 5F to which the container C to be retrieved has moved, the claw 46 of the claw member 45 will project. The container C is guided by the claw 46 so as to be off from the revolving track in the stock section 14, and the moving direction of the container C to be retrieved is changed toward the transfer section 16b. Thus, the container C can be released from the held state in the stock section 14 and guided toward the transfer section 16b.

As described above, the container C is forcibly released from the held state by the claw member 45 so as to move to the transfer section 16b. Owing to this, even though the container C is held by the magnetic force of the permanent magnet in this embodiment, the container C can be released easily. Therefore, the container C can be released from the held state by a simple structure and transferred, without being electrically released using an electromagnet.

Similar to the other transfer sections 16b and 16c, a container C held in the weighing section 13 and a container C held in the discharge section 15 can be released using the claw 46 of the claw member 45, and the containers C are transferred between the weighing section 13 and the stock section 14 and between the discharge section 15 and the weighing section 13.

Structure of the Revolving Mechanism

Figure 12:
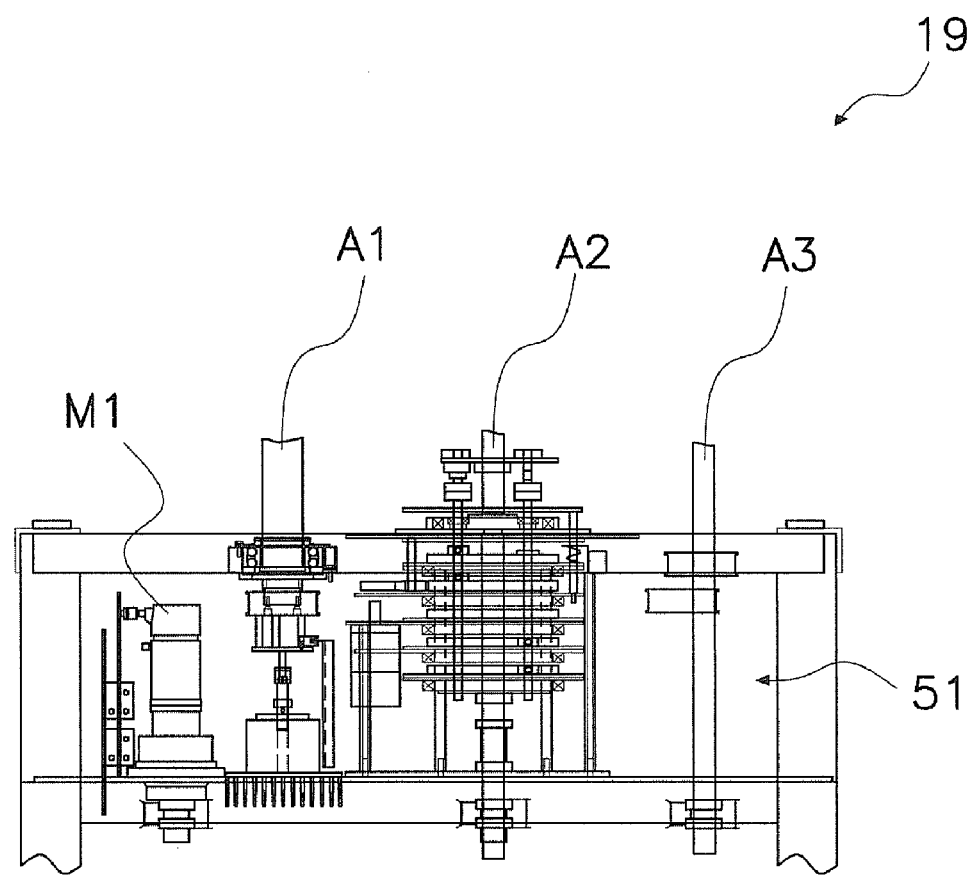
FIG. 12 is a side view of a revolution mechanism.

The revolving mechanism 19 included in the weighing device 10 in this embodiment imparts a rotational drive force to the weighing section 13, the stock section 14, the discharge section 15, and the transfer sections 16a through 16c as described above. As shown in FIG. 1, the revolving mechanism 19 is located in a lower part of the weighing device 10. As shown in FIG. 12, the revolving mechanism 19 includes the rotation motor M1 and a transmission section 19a.

The transmission section 19a transmits a rotational drive force of the rotation motor M1 to the rotation axis body A1 for rotating the weighing section 13, the rotation axis body A2 for rotating the stock section 14, and the rotation axis body A3 for rotating the discharge section 15, and the rotation axis body A4 for rotating the transfer sections via a gear, a pulley and a belt (not shown). Thus, the rotation axis bodies A1 through A4 are rotated such that the weighing section 13, the stock section 14 and the discharge section 15 are rotated in synchronization. The sections for transferring the containers C are rotated in synchronization, which means that the sections cause the containers C to revolve at the same speed. Therefore, the containers C held in the sections can be transferred smoothly.

As described above, the rotation axis bodies A4 rotate the transfer sections 16a through 16c in the opposite direction to the weighing section 13, the stock section 14 and the discharge section 15. Therefore, with the weighing device 10 in this embodiment, the transmission section 19a inverts the rotation direction of the rotation driving force to be transmitted to the rotation axis bodies A4.

Figure 13:
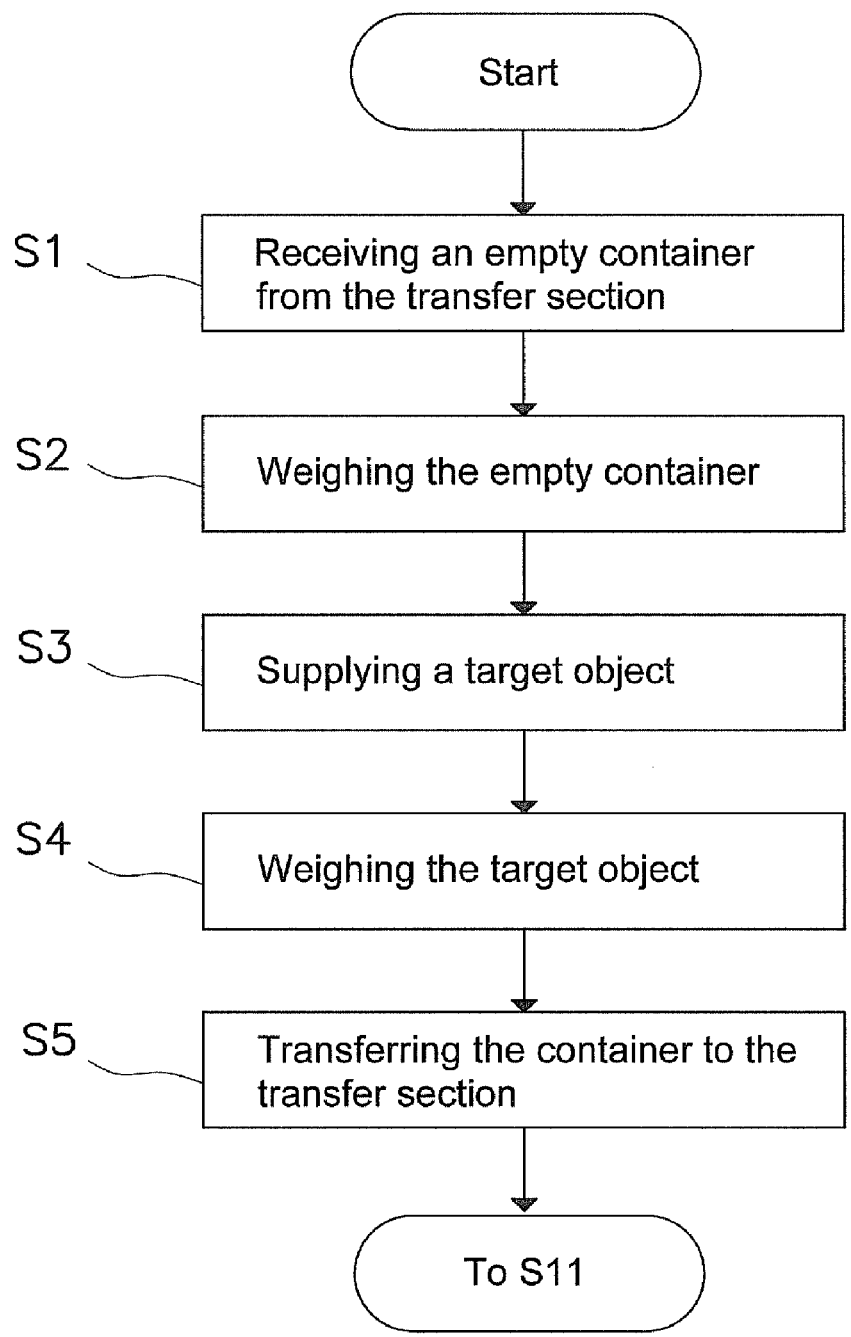
FIG. 13 is a flowchart showing the operation of the weighing device during supply and weighing steps.
Figure 14:
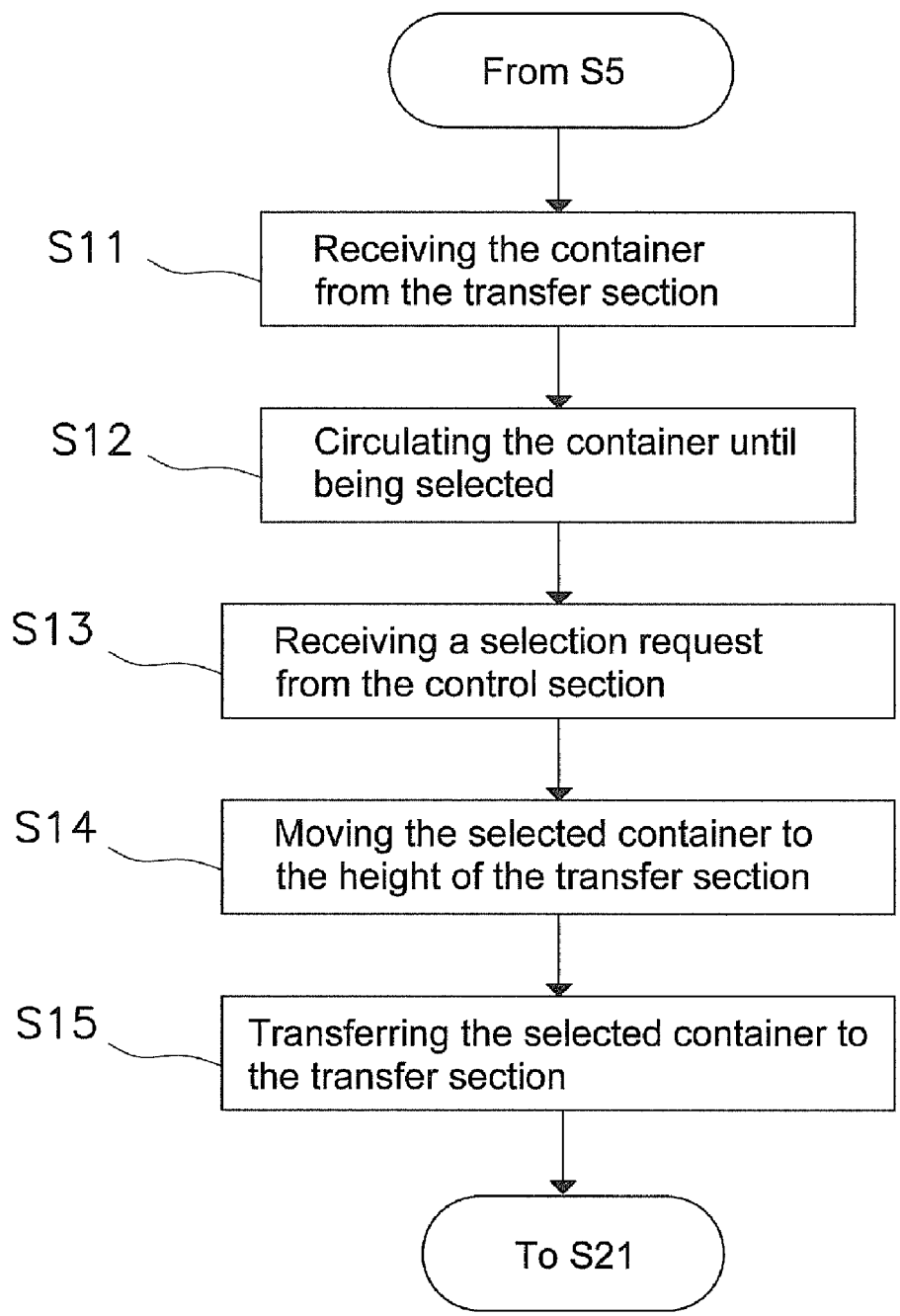
FIG. 14 is a flowchart showing the operation of the weighing device during a stock step.
Figure 15:
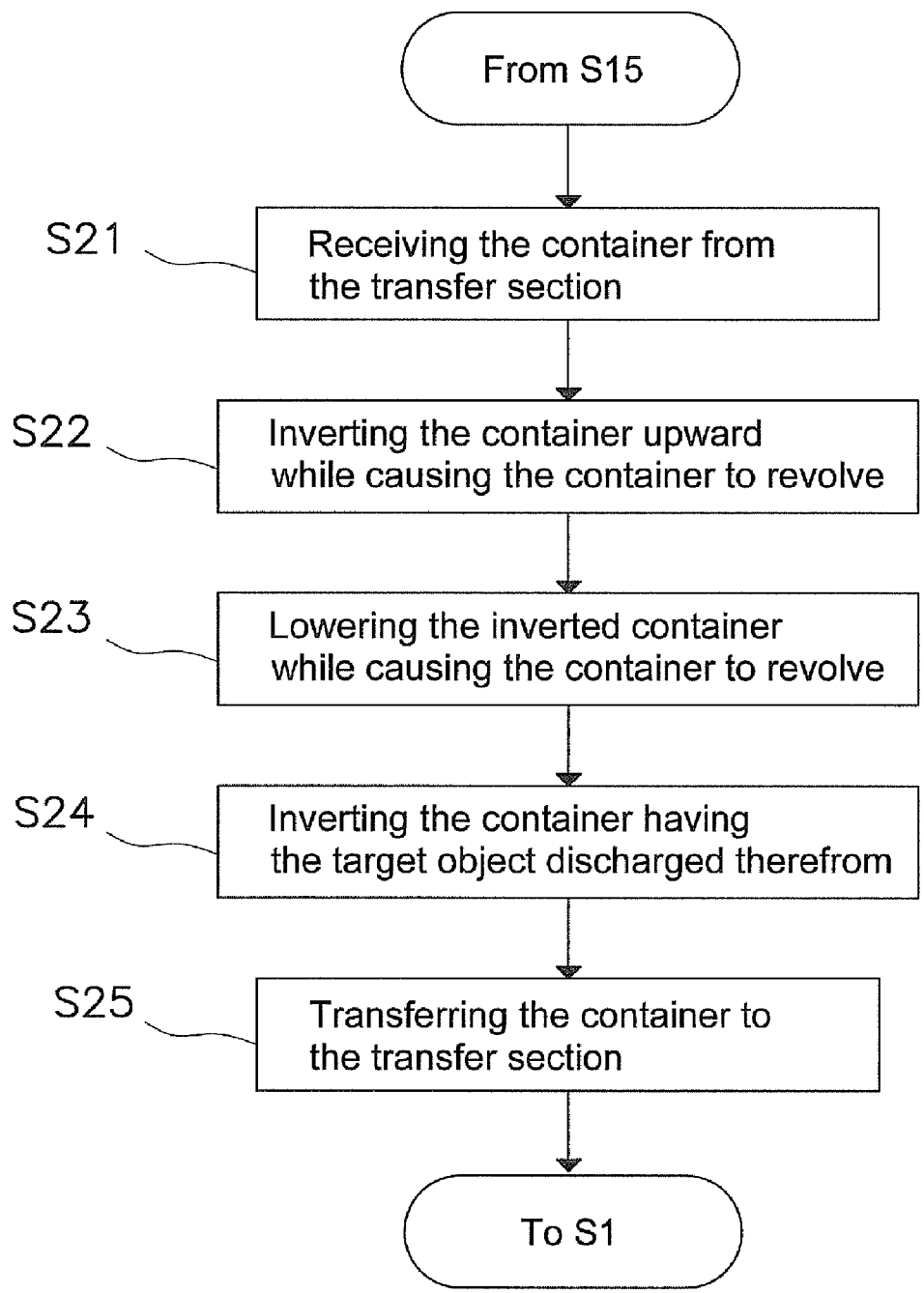
FIG. 15 is a flowchart showing the operation of the weighing device during a discharge step.

Weighing to Discharging Operation by Means of the Weighing Device in this Embodiment Hereinafter, with reference to flowcharts in FIG. 13 through FIG. 15, the flow of processing performed by the weighing device 10 in an embodiment having the above-described structure will be described. The steps performed in accordance with the flowcharts shown in FIG. 13 through FIG. 15 are in a control flow controlled by the control section 20 (see FIG. 1).

First, with reference to the flowchart in FIG. 13, a supplying and weighing step in the weighing section 13 will be described.

In the weighing section 13, in step (hereinafter, referred to simply as "S") 1, an empty container C is received from the transfer section 16c. In S2, the empty container C is weighed before a target object is supplied by the supply section 12. Next in S3, the supply section 12 sequentially places target objects into containers C which are caused to revolve by the weighing section 13. In S4, the weighing section 13 weighs each container C accommodating a target object. By subtracting the weight result of the empty container C from the weight result of the container C storing the target object, the weight of the target object can be found. Finally in S5, the weighed container C is transferred to the transfer section 16a. When the container C received in S1 is not empty, the weight of the target object newly added to the container C is found by subtracting the weight result in S2 from the weight result in S4. By adding the weight of the target object already in the container C to the weight of the newly added target object, the total weight of the target objects in the container C can be found as the weight result.

The weighing section 13 sends the weight result to the control section 20. The control section 20 stores the received weighing results of the target objects in a storage section such as a ROM, a RAM or the like, and thus stores data for performing combination weighing.

Next, with reference to the flowchart in FIG. 14, a step of storing containers C in the stock section 14 will be described.

In the stock section 14, in S11, a weighed container C is received from the transfer section 16a by the holder 31 in the storage section 30. Next in S12, the container C is circulated (is placed into a wait state) in the stock section 14 so as to be held in the storage section 30 until the container C is selected by the control section 20. At this point, the position of the container C which is in the wait state in the stock section 14 while containing the target object corresponding to the weight data, is stored in the storage means such as the RAM or the like in association with the weight data obtained as a result of weighing. When a selection request is received from the control section 20 in S13, the selected container C is moved vertically in S14. As shown in FIG. 6, the selected container C is moved to the height corresponding to 5F at which the transfer section 16b is located. Next in S15, the selected container C is transferred to the transfer section 16b. The container C transferred to the transfer section 16b is then processed in S21 shown in FIG. 15. Although not shown in the flowchart, in order to add a new container C from the weighing section 13 to the position in the storage section 30 at which the container C which was transferred had been held, the stock section 14 causes the storage section 30 to revolve around the rotation axis body A2 to the transfer section 16a while keeping the storage section 30 at the same height. Then, a new weighed container C is added from the transfer section 16a to the position.

With the weighing device 10 in this embodiment, as shown in FIG. 6, the stock section 14 receives and transfers containers C at the same height (at 5F in FIG. 6). Therefore, the operation of transferring a container C to receiving a new container C can be smoothly performed merely by causing the storage section 30 to revolve. In the storage section 30, the new container C is added at the position where the container C which was transferred had been held. Therefore, the container C can be supplemented without moving the storage section 30 vertically. Since the amount that the container C moves can be reduced, the impact or the like applied to the target object in the container C can be alleviated, and thus the target object can be protected.

Finally, with reference to the flowchart shown in FIG. 15 and FIG. 10(a) through FIG. 10(f), a step of discharging a target object from the container C in the discharge section 15 will be described.

Figure 10:
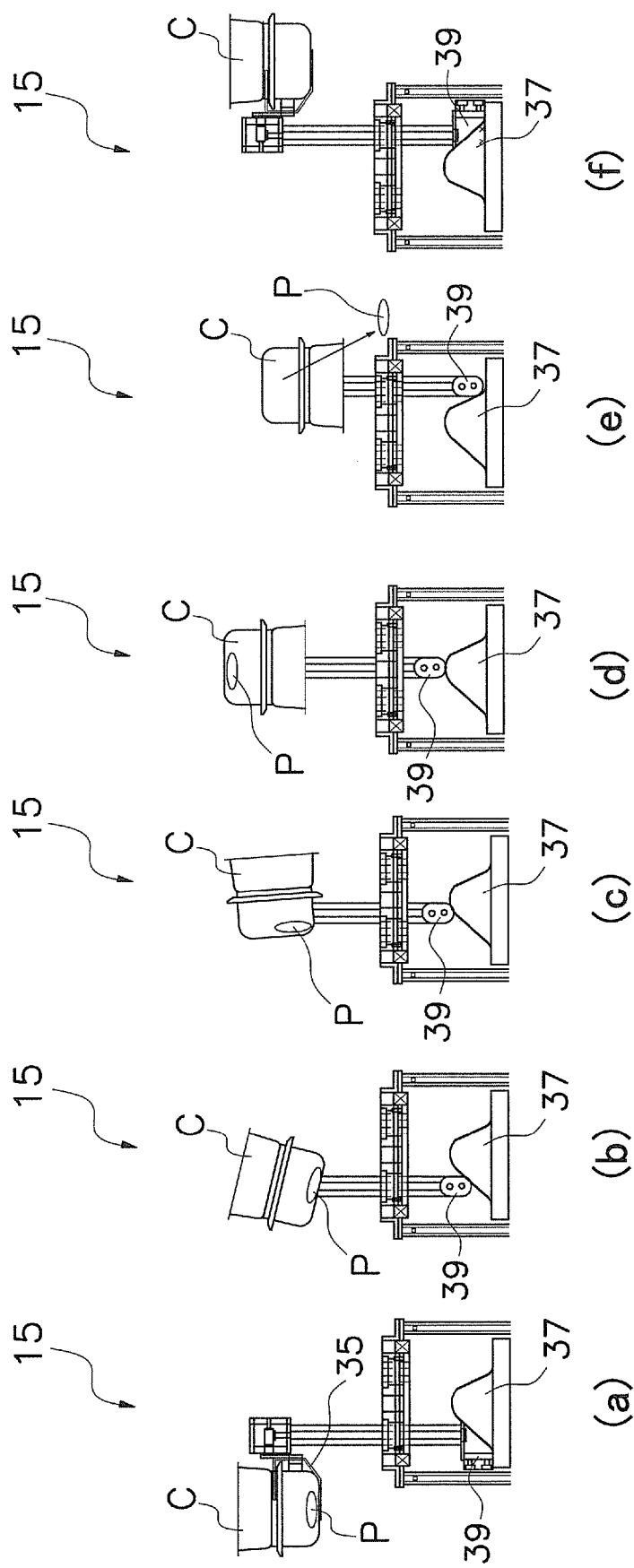
FIG. 10(a) through FIG. 10(f) show a discharge method carried out by the discharge section shown in FIG. 8 and FIG. 9.

In the discharge section 15, as shown in FIG. 10(a), the selected container C is received by the holder 35 from the transfer section 16b in S21. In S22, as shown in FIG. 10(b), the container C is elevated while revolving around the rotation axis body A3. When the container C starts to be elevated, the rotation of the container C is simultaneously started. The position of the container C on a plane at this point is the "container rotation start" position represented in FIG. 9 with a two-dot chain line. As shown in FIG. 10(c), the container C is further rotated as it is being elevated. As shown in FIG. 10(d), the container C is rotated at 180 degrees and inverted so as to be open downward before arriving the uppermost point. Next, in S23, as shown in FIG. 10(e), after the container C is inverted at 180 degrees, the container C is lowered in that state. The position of the container C on a plane at this point is the "final inverted container" point represented in FIG. 9 with another two-dot chain line. At this point, the target object is displaced from the revolving track of the container C in the discharge section 15, and discharged toward the center of the discharge chute 17, or the vicinity thereof, which is located in a tangential direction of the revolving track. The position of the container C on a plane at this point is the "discharge completion" position represented in FIG. 9 with yet another two-dot chain line. In S24, as shown in FIG. 10(f), the container C that has discharged the target object is rotated back at 180 degrees to be open upward. Finally in S25, the container C is transferred to the transfer section 16c.

As described above, the container C revolves by means of a rotational drive force from the rotation motor M1 of the revolving mechanism 19 being transmitted to the rotation axis bodies A1 through A4. By contrast, the container C is elevated or lowered, i.e., moved vertically, by the guide section 39 attached to the bottom of the shaft 36 moving along the inclining plate 37.

With the weighing device 10 in this embodiment, as described above, when the target object is discharged from the container C, the discharge section 15 moves the container C vertically and also rotates the container C at 180 degrees. This can give a vertically upward inertial force to the target object. Therefore, even where a plurality of target objects are contained in the container C, the target objects are assembled together at the bottom of the container C. As a result, the target objects are prevented from being discharged from the container C immediately after the container C starts to be rotated and also prevented from being discharged sequentially.

With the weighing device 10 in this embodiment, the discharge section 15 inverts the container C at 180 degrees, and then lowers the container C vertically. Usually, where a plurality of target objects, such as potato chips, are contained in the container C, when the container C is merely inverted to discharge the plurality of target objects, there is a delay between the time at which the first target object is discharged and the time at which the final target object is discharged. When this occurs, the target objects are discharged from the container C in the form of a lengthy strip, and the problem of so-called sequential discharge arises. With the weighing device 10 in this embodiment, the discharge section 15 lowers the container C vertically after inverting the container C. This can gives a vertical downward force to the target objects which are to be discharged from the container C with a delay among the plurality of target objects. Therefore, the delay between the time at which the first target object is discharged and the time at which the final target object is discharged from the container C is eliminated, which solves the problem of sequential discharge. The discharge section 15 can also control the container C to be inverted so that the target object is discharged, or not to be inverted and transferred to the weighing section 13 while containing the target object.

Features of the Weighing Device in this Embodiment (1) With the weighing device 10, the power supply mechanism 50 in the weighing section 13 includes two coils 52 and 56. Therefore, it is not necessary to provide a light emitting device such as a lamp to perform solar energy power generation. This makes the maintenance relatively easy.

A photovoltaic panel having a relatively large area, which is necessary to generate power upon receiving light, is not necessary. This makes the power supply mechanism 50 compact.

(2) The weighing section 13 of the weighing device 10 includes one power supply mechanism 50 for five weighing members 25a through 25e. Therefore, the power supply mechanism 50 needs to have a high power supply capability.

In light of this, the power supply mechanism 50 retrieves an induced electromotive force using two coils 52 and 56 instead of using the conventional photovoltaic power generation. Therefore, a high power supply capability is achieved with the power supply mechanism 50 having a relatively compact structure.

In addition, owing to the two coils 52 and 56, the power supply mechanism 50 continuously provides power without any battery. Owing to such a battery-free structure of the power supply mechanism 50, the initial installation costs and maintenance costs for the weighing device 10 can be lower than those for a structure having a combination of a power supply mechanism for performing photovoltaic power generation and a charging section. With a structure that supplies power to a weighing member via a battery, weighing cannot be performed while the battery is being charged. In the battery-free weighing section 13, weighing is possible immediately after the weighing device 10 is started.

(3) In the power supply mechanism 50 of the weighing section 13 in the weighing device 10, the secondary coil 56 facing the primary coil 52 spins, but does not move in a direction (e.g., in a horizontal direction) that intersects the rotation axis A11 thereof. Therefore, the secondary coil 56 of the rotatable section 55 does not move away from the primary coil 52 of the fixed section 51. As a result, the electromotive force is constantly and stably induced in the secondary coil 56.

Embodiment 2

Another embodiment according to the present invention will be described with reference to FIG. 16 and FIG. 17.

A combination weighing device 60 according to this embodiment separately provides objects such as food items or industrial products to a plurality of containers each having a top opening, selects containers such that the total weight of the target objects accommodated in the selected containers is within a predetermined weight range, and discharges a plurality of objects within the predetermined weight range.

As shown in FIG. 16, the combination weighing device 60 includes four weighing devices 10 according to Embodiment 1, and a discharge chute 17.

The combination weighing device 60 includes a control section 20 connected to the four weighing devices 10. The control section 20 is included in one of the four weighing devices 10.

The control section 20 receives data on the weight of a target object, which is weighed in the weighing section 13 of each of the four weighing devices 10 and stored in the stock section 14, from the weighing section 13. The control section 20 combines target objects contained in the containers C that are stored in the stock section 14 of each of the four weighing devices 10, such that the total weight of the combined target objects is within a desired weight. When the control section 20 determines a combination to realize a desired weight, the containers C containing the target objects used for the combination are selected and retrieved from the stock sections 14 of the weighing devices 10. Then, the desired target objects are discharged from the containers C in the discharge sections 15 and thrown into the discharge chute 17.

Figure 17:
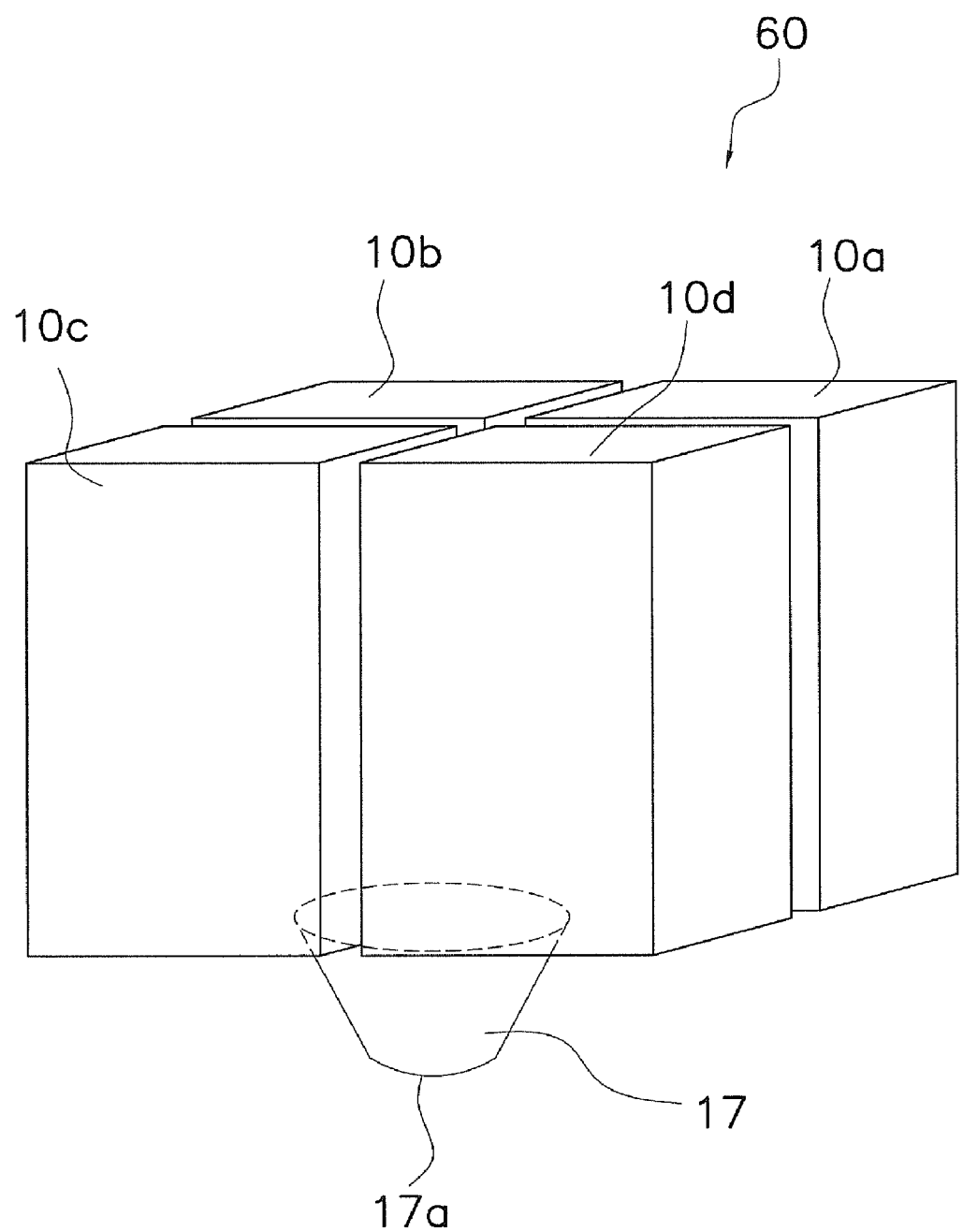
FIG. 17 is a perspective view of a combination weighing device according to a second embodiment of the present invention.
Figure 18:
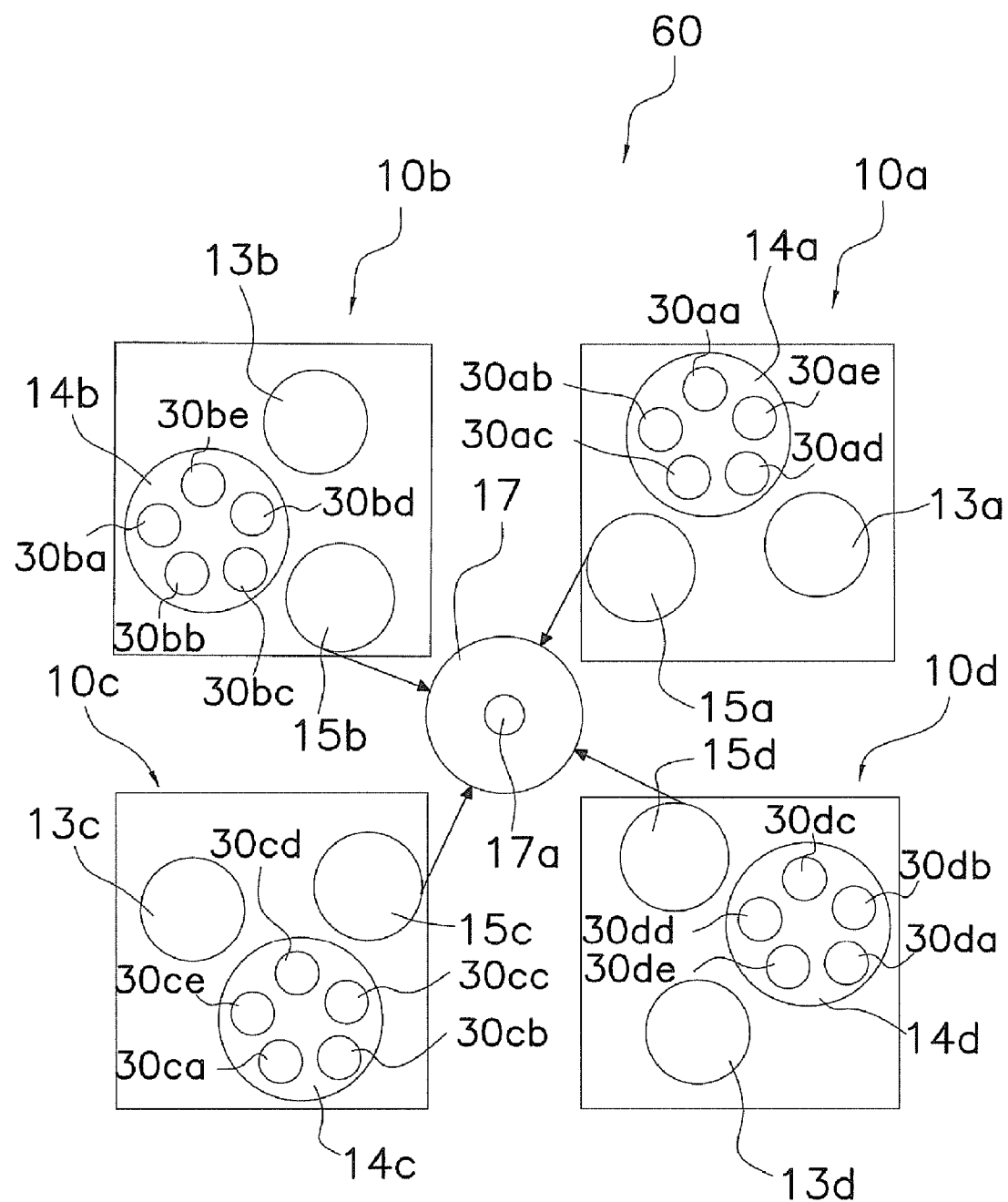
FIG. 18 is a plan view showing an operation in which combination weighing is performed by means of the combination weighing device.

As shown in FIG. 17, combination weighing by the combination weighing device 60 in this embodiment is performed in a state in which four weighing devices 10a through 10d are located so as to surround the discharge chute 17.

The weighing devices 10a through 10d respectively include weighing sections 13a through 13d, stock sections 14a through 14d, and discharge sections 15a through 15d, as described in Embodiment 1. The stock sections 14a through 14d each include five storage sections 30aa through 30de. The five storage sections each hold five containers C vertically as described above.

In the combination weighing device 60 in this embodiment, the control section 20 included in the weighing device 10 in Embodiment 1 is included only in the weighing device 10a. This control section 20 controls the operation of the four weighing devices 10. Namely, the control section 20 in the weighing device 10a combines the weights of the target objects which are contained in the plurality of containers C stored in the stock sections 14a through 14d in the four weighing devices 10a through 10d. Target objects are discharged from three or four of the weighing devices 10a through 10d toward the bottom opening 17a of the discharge chute 17, such that the total weight of the discharged target objects is within a desired weight range.

With the combinational weighing device 60 including the four weighing devices 10a through 10d as described above, containers C containing the target objects having a desired weight among the five containers C held vertically in, for example, the storage section 30ac in the stock section 14a of the weighing device 10a are transferred to the discharge section 15a.

Concurrently, in the other weighing devices 10b through 10d, containers C containing the target objects having a desired weight for the combination weighing, among the five containers C held in each of the four storage sections 30bc through 30dc in the stock sections 14b through 14d, are similarly transferred to the discharge sections 15b through 15d.

Then, in the weighing devices 10a through 10d, combination weighing is performed using five containers C held in the four storage sections 30da through 30dd in the stock sections 14a through 14d, i.e., 20 containers C.

After this, combination weighing is similarly performed using 20 containers C of weight data in the storage sections 30ae through 30de, 30aa through 30da, and 30ab through 30db.

With the combination weighing device 60 in this embodiment, as described above, in the storage sections 30aa through 30de included in the stock sections 14a through 14d, combination weighing is performed using the storage sections 30aa, 30ba, 30ca and 30da as one group, the storage sections 30ab, 30bb, 30cb and 30db as one group, the storage sections 30ac, 30bc, 30cc and 30dc as one group, the storage sections 30da, 30bd, 30cd and 30dd as one group, and the storage sections 30ae, 30be, 30ce and 30de as one group.

When, for example, combination weighing is performed by discharging the target objects only from the three weighing devices 10a through 10c of the four weighing devices 10a through 10d, the containers C are not inverted in the discharge section 15d in the weighing device 10d in which no target object is discharged.

Combination weighing, which is performed using a plurality of containers C held in the storage sections 30 in the stock sections 14a through 14d, can be performed continuously with no need to wait for each of the stock sections 14a through 14d to rotate back to the previous position.

With this type of combination, the target objects may be discharged from each of the four weighing devices 10. Alternatively, when one weighing device 10 includes containers C that contain target objects of a desired weight range from the beginning, the target objects may be discharged from one such weighing device 10.

Thus, target objects within a desired weight range can be discharged. By combining four weighing devices 10 in Embodiment 1 in this manner, high speed processing of, for example, over 200 times per minute, is realized.

Other Embodiments

Embodiments of the present invention have been described. The present invention is not limited to the above embodiments, and various modifications are possible without departing from the scope of the invention.

(A) In Embodiment 1, the weighing section 13, the stock section 14, and the discharge section 15 each function as a transporting mechanism of a container C. For example, the weighing device 10 and the transporting mechanism are provided as one single mechanism. The present invention is not limited to this. For example, in the weighing section 13 or the like, a transporting mechanism of a container C may be provided as a separate mechanism.

(B) In Embodiment 2, a combination weighing device 60 including four weighing devices 10 is described. The combination weighing device according to the present invention is not limited to this. For example, even one weighing device 10 is capable of functioning as an automatic weighing device or a combinational weighing apparatus. However, it is preferable that a combination weighing device includes a plurality of weighing devices 10 as in Embodiment 2, in order to perform the process from weighing to discharging at high speed. For example, the combination weighing device 60 in Embodiment 2 will ensure that the process can be performed up to 240 times/min. Accordingly, the number of weighing devices 10 to be used for combination weighing may be determined in accordance with the desired discharging capability.

(C) In the above embodiments, the weight data on a target object is stored in the storage means such as a RAM or the like in the weighing device 10. The present invention is not limited to this.

For example, an ID tag attached to a container C may store the weight data on a target object contained in the container C. In this case, the weight data moves together with the container C. Therefore, the container C and the weight data on the target object contained therein can be easily and reliably associated with each other.

INDUSTRIAL APPLICABILITY

A weighing device according to the present invention is designed so as to have a movable section which is freely movable with respect to a fixed section in a power supply mechanism, to make maintenance work relatively easy, and is useful as a weighing device including a weighing member for weighing an object while moving.

The invention claimed is:

1. A weighing device, comprising:
   a weighing member configured to weigh an object while moving; and
   a power supply mechanism comprising a fixed section, a movable section configured to be movable in accordance with the movement of the weighing member, a primary coil provided on the fixed section, and a secondary coil provided on the movable section and facing the primary coil, the power supply mechanism being configured to supply power to the primary coil and to retrieve an induced electromotive force from the secondary coil to supply power to the weighing member, the power supply mechanism being further configured to transmit a signal indicative of a weight data of the object weighed by the weighing member between the secondary coil and the primary coil in a non-contact manner.

2. A weighing device according to claim 1, comprising a plurality of weighing members, wherein the power supply mechanism is configured to divide and supply power to the plurality of weighing members.

3. A weighing device according to claim 1, wherein the power supply mechanism further comprises a rectification circuit and a smoothing circuit provided on a power supply path from the secondary coil to the weighing member.

4. A weighing device according to claim 1, wherein power is supplied only from the power supply mechanism, and the weighing device does not include a charger.

5. A weighing device according to claim 1, wherein the secondary coil is configured to spin in accordance with the movement of the weighing member but not move in a direction that intersects with the rotational axis of the spinning.

6. A weighing device according to claim 1, wherein the weighing member moves along a circulating trajectory.

7. A weighing device according to claim 1, wherein the weighing member is configured to weigh a container containing an object while moving together therewith.

8. A weighing device according to claim 1, wherein the weighing member outputs weight data wirelessly.

9. A weighing device according to claim 1, wherein the weighing member ships in and ships out the container containing the object while moving the container.

10. A weighing device according to claim 1, further comprising a storage section configured to store a weight result of the weighing member in association with a container containing an object.

* * * * *